United States Patent
Ishihara

(10) Patent No.: US 6,805,540 B2
(45) Date of Patent: Oct. 19, 2004

(54) FLAP VENTLID INSTALLING ASSEMBLY, FLAP VENTLID INSTALLING STRUCTURE AND INSTALLING METHOD, AND MOLD FOR MOLDING A TIRE

(75) Inventor: Yasuyuki Ishihara, Toukai (JP)

(73) Assignee: NGK Industries, Ltd., Nagoya (JP)

( * ) Notice: Subject to any disclaimer, the term of this patent is extended or adjusted under 35 U.S.C. 154(b) by 0 days.

(21) Appl. No.: 10/454,107

(22) Filed: Jun. 4, 2003

(65) Prior Publication Data

US 2004/0000625 A1 Jan. 1, 2004

(30) Foreign Application Priority Data

Jun. 28, 2002 (JP) ........................................ 2002-190431
Apr. 23, 2003 (JP) ........................................ 2003-118157

(51) Int. Cl.[7] ............................................... B29C 35/02
(52) U.S. Cl. ..................................... 425/28.1; 425/812
(58) Field of Search .............................. 425/28.1, 812; 249/141

(56) References Cited

U.S. PATENT DOCUMENTS

| | | | | |
|---|---|---|---|---|
| 3,374,983 A | * | 3/1968 | Garretson et al. | 425/812 |
| 4,021,168 A | * | 5/1977 | Dailey | 425/28.1 |
| 4,874,308 A | * | 10/1989 | Atlas et al. | 425/812 |
| 5,922,237 A | * | 7/1999 | Green | 249/141 |
| 2002/0071880 A1 | | 6/2002 | Ishihara | |

FOREIGN PATENT DOCUMENTS

| | | | |
|---|---|---|---|
| JP | 61-252113 | * | 11/1986 |
| JP | 09-141660 | | 6/1997 |
| JP | 2002-234033 | | 8/2002 |

* cited by examiner

*Primary Examiner*—James P. Mackey
(74) *Attorney, Agent, or Firm*—Burr & Brown

(57) ABSTRACT

A flap ventlid installation assembly provided for installing a flap ventlid at an opening of an air removing hole on a design surface of a tire mold includes a flap ventlid and an anchor member. The anchor member includes a top portion connected to the flap ventlid, and a longer portion extending from the top portion to an opposed second end that has a first shape that cannot be inserted into the air removing hole without elastically deforming the first shape into a second shape that can be press-fit into the air removing hole. When the flap ventlid is installed in the tire mold, at least a part of the flap ventlid contacts the design surface of the mold when the anchor member is press fit into the opening such that the second shape engages a portion of the air removing hole proximate the other surface of the mold.

8 Claims, 18 Drawing Sheets

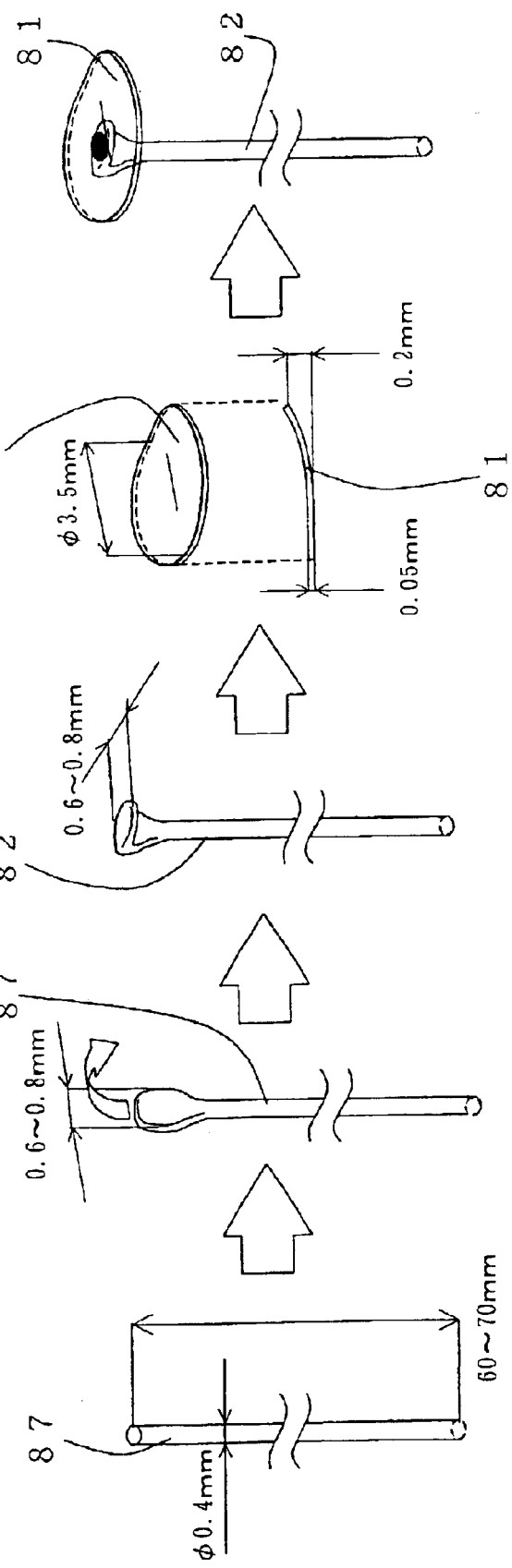

FLAP VENTLID INSTALLING ASSEMBLY, FLAP VENTLID INSTALLING STRUCTURE AND INSTALLING METHOD, AND MOLD FOR MOLDING A TIRE

This application claims the benefit of Japanese Application P2002-366679, filed Dec. 18, 2002, the entirety of which is incorporated herein by reference.

BACKGROUND OF THE INVENTION

(1) Field of the Invention

The present invention relates to a flap ventlid installation assembly, a flap ventlid installation structure, a method for installing the flap ventlid installation assembly, and a mold for molding a tire. More particularly, the present invention relates to a flap ventlid installation assembly including a flap ventlid which can prevent the occurrence of spew (e.g., whisker projections) and burred extensions formed on a tire surface during tire molding to retain the desired initial performance or external appearance of the obtained tire in a satisfactory state and which can be simply installed in the tire mold. Clogging of mold ventholes due to penetration of rubber burrs can also be easily avoided. The present invention relates to a flap ventlid installation structure, a method for installing the flap ventlid installation assembly, and a mold for molding a tire.

(2) Related Art Statement

The molds for molding a tire are often manufactured by casting, which fits for forming complicated shapes conforming to a complicated surface shape designed to have numerous thin projections, such as sharp corners or blades for a tire.

Tire molds manufactured by casting are ordinarily divided into sub-molds, and these sub-molds are combined to form a predetermined whole form at the time of molding the tire. Methods for dividing the mold into sub-molds include a method of cutting the mold into 7-11 sub-molds along the circumference (segmented mold type) and a method of cutting the mold into 2 sub-molds in the direction of the central axis (one cast ring type). These methods can be optionally selected depending on the production conditions, etc.

Molding a tire using a divided mold type is ordinarily performed by compression molding which comprises pressing tire raw material (a green tire) comprising a polymerized rubber material into a mold before molding the application of the design.

In the course of such compression molding, closed spaces (i.e., blockade spaces) are formed between the green tire material and the mold surface on which projections and depressions such as ribs, blades, and the like are formed when the green tire material is pressed into the mold. During molding, air within the blockade spaces is not discharged therefrom, and thus, air bubbles are contained in the finally obtained molded tire. This is a problem in that air bubble defects called "bears" are produced.

Further, after molding, the tire molds should regularly be subjected to inspection and maintenance treatments, including periodic cleanings and the like, since the surface of the mold is roughened due to the adherence of oils and fats and the like during repeated use. Depending on the mold, this cleaning can become troublesome, requiring long cleaning times and expensive equipment. This results in a problem in that the production costs of the articles produced increase.

To prevent the formation of the aforementioned "bear" defects, methods of removing air from molds are usually implemented to cope with this situation. For example, as means for removing air from the closed spaces, two types of means have been conventionally employed, one of which is known as a venthole type means and the other is known as a non-spew or slit vent type means.

In methods employing venthole type means, air within blockades is discharged therefrom to the outside through air removal apertures called ventholes that are formed in the mold to lead to the blockades. In this method, the manufacturing costs of the mold are less expensive, and this method has an advantage since one may employ a simple blast method, which comprises blowing media such as glass beads, resin beads, dry ice pellets, and the like to the interior surface of the mold with high-pressure air, for maintenance and inspection purposes. However, spew (whisker projections) is formed on the final molded tire (the tire product) since air is discharged accompanying the outflow of raw tire material (a green tire) into ventholes when the venthole type means is used. This is a disadvantage in that the desired external appearance and initial running performance of the molded tire are deteriorated by the presence of the spew on the final molded tire.

In methods employing a non-spew or slit vent type means, air within blockades is discharged to the outside through gaps formed between sub-molds or slit-like air removal means provided in the predetermined locations. Thus, this method is superior with respect to the external appearance of the final molded tire. Further, there is an advantage in that an adverse effect on the initial running performance is not seen. While the occurrence of spew can be prevented when a non-spew or slit vent type means is employed, however, the formation of burred extensions are not prevented. Further, in the case of this type of a mold, not only is the mold production cost expensive, but there is also a disadvantage in that clogging during molding readily occurs. In addition to the above, with regard to maintenance and inspection, the mold should be broken down into each sub-mold if one employs a simple blast method. Thus, several man-hours are required for cleaning by blasting. Further, since slit portions readily clog with repeated blasting and the contaminants accumulated in slit portions are difficult to remove, special cleaning methods such as chemical cleaning and plasma cleaning should be used. This requires longer cleaning times and introduces expensive equipment, which is a disadvantage in that the production costs of the molded products increase.

As mentioned above, there are respective advantages and disadvantages in these two type means for air removal means. Therefore, at present, one should choose a proper mold, taking into consideration the use of tire to be produced, production costs, and the like. That is, at present, a mold quipped with a non-spew type means is used when serious consideration must be given to the external appearance and the initial performance of a tire, with the acceptance of a relatively expensive production cost. On the other hand, a mold equipped with a venthole type means is used when serious consideration must be given to the production cost of a mold and the costs of molding the tire, with the acceptance of a relatively poor external appearance and relatively poor initial running performance of a finally molded tire. Thus, a satisfactory balance with respect to all the desired aspects, including the external appearance, the initial performance and the production costs of the tire, is sought after.

In light of these circumstances, various types of measures have been proposed. For example, in JP-A-9-11460, a mold that is equipped with air removal lids that are provided in ventholes is provided. The air removal lid is provided with a movable lid insert comprising an axis and a lid head disposed thereon. This lid head is provided with a cavity and a surface having a circular-truncated-cone-shape on the opposite side of the cavity, and is mostly flat on the side near to the cavity. Further, this air removal lid is provided with a casing and is press fit into the venthole together with this casing.

The air removal lid thusly configured has the functions mentioned below. Namely, the lid insert is always pressed to the upper side by means of a spring loaded with force. Moreover, during compression molding using a green tire, the lid insert is pressed down in opposition to the loaded force of a spring by means of pressing the level surface of the lid head into the green tire. During this downward pressing, air can be removed through gaps, that is, air passages, formed between the casing and lid insert. Further, infiltration into air passages of the green tire material can be prevented by interrupting air passages with such contact of the casing and the circular-truncated-cone-shaped surface when compression molding is completed. Furthermore, the lid insert is pushed upwardly again by means of a loaded spring in the cavity during removal of the vulcanized tire from the mold after vulcanization is completed.

Nonetheless, a mold provided with this air removal lid suffers, as mentioned later, from clogging in a relatively high frequency due to the constraints of that structure. The "leakage distance," which is an index for judging the easiness in clogging, defined as "Area in the Opening and Closing Surface of an Air Removal Lid, and possible defined also as the contact area between the casing and the circular-truncated-cone-shaped surface" in the case of the device disclosed in JP-A-9-141660. In other words, the "distance from the peripheral portion of the lid opening and closing surface to the holes for air removal" and the distance from the peripheral portion of the casing to the entrance of air passages in the case of the device disclosed in JP-A-9-141660 cannot be set to be long. In this event, rubber burrs readily teach up into the air removal holes, i.e., air passages, during tire molding. As a consequence, there is such a problem in that the burrs infiltrate into air removal holes and cause clogging. Namely, the constraints are present as a result of the structure since the air removal lid must be embedded inside a tubular casing and stored. To avoid interference in designing, one can not employ a casing having an external diameter in terms of radius of approximately 3 mm or more. In this event, the internal diameter of the casing should be shortened to have a long leakage distance. The radius, however, must be approximately 1.6 mm even at a minimum since the air removal lid is housed in the venthole. Therefore, since there exists the boundary in having a long this leakage distance, clogging occurs readily from rubber burr infiltration into air removal holes (air passages). Thus, this brings a problem in that increased maintenance expenses (i.e., running costs) cannot be eliminated. Moreover, in the case that rubber burrs which have been temporarily infiltrated into the internal area of the air removal holes (air passages) are cut off when the tire is demolded, this would result in a further rise in the probability of the occurrence of clogging. This is because a portion corresponding to the leakage distance is housed in the internal portion of the air removal holes (air passages). Further, there is a problem in that production costs increase due to the numerous parts and complicated structures.

With respect to these problems, the inventors have proposed a flap ventlid which is provided on the tire mold surface side (design surface) of the venthole and which has a lid mechanism wherein when tire is molded by pressing a green tire to the respective surface of a tire mold, air is discharged from blockades, the lid mechanism maintains an open state by spring up until the green tire contacts an upper portion of the mold and air is discharged from the blockades. The degree of spring up of the lid mechanism is reduced during the time when the green tire contacts the upper portion of the lid mechanism to a time when it reaches the surface of sub-molds. Simultaneously, the green tire is prevented from flowing out when the lid mechanism forms a closed state wherein the ventlid intimately contacts the green tire (by dissolving its springing up) when the green tire reaches the surfaces of said sub-molds (Japanese Patent Application No.2001-275807).

By installing the flap ventlid constructed as described above in a tire mold, the occurrence of spew (whisker projections) and burred extensions on a tire surface can be prevented during molding and the obtained tire can have a good initial performance and external appearance, and, at the same time, the tire molding mold production costs per se can be reduced, clogging derived from rubber burr infiltration in ventholes can be effectively prevented and the running costs can be reduced by simplifying maintenance and inspection work.

SUMMARY OF THE INVENTION

The object of the present invention is to further improve the above-mentioned flap ventlid and to provide a flap ventlid installation assembly, a flap ventlid installation structure , a method for installing the flap ventlid installation assembly and a mold for molding a tire. The flap ventlid installation assembly can prevent the occurrence of spew (whisker projections) and burred extensions on a tire surface during tire molding and can maintain the desired initial performance and-external appearance of the resulting tire in a satisfactory state and can be simply installed in a tire molding mold, while clogging derived from rubber burr infiltration in air removing holes (ventholes) can be easily avoided.

In order to attain the above objects, the present invention provides the following flap ventlid installation assembly, flap ventlid installation structure flap ventlid installation assembly, installation method, and tire mold.

According to one embodiment of the present invention, a flap ventlid installation assembly is provided for installing a flap ventlid at an opening of an air removing hole (venthole) formed on the design surface of a tire mold. The flap ventlid installation assembly includes a flap ventlid which functions as an opening and closing lid that passes or interrupts the air flow at the opening, and an anchor member. The top portion of the anchor member is connected to the flap ventlid, and the anchor member also has a longer portion which cannot be inserted as it is into the opening of the air removing hole without applying an external force to the longer portion to change the shape into one that is capable of being press fit into the air removing hole through the opening. The flap ventlid can be installed in the opening of the air removing hole of the mold such that at least apart of the flap ventlid contacts the design surface of the tire mold by press fitting (i.e., interference fitting) the anchor member into the air removing hole (hereinafter sometimes referred to as "the first invention").

According to another embodiment of the present invention, a f lap ventlid installation assembly is provided for installing a flap ventlid at an opening of an air removing hole (venthole) formed on the design surface of a tire mold.

The flap ventlid installation assembly includes a flap ventlid which functions as an opening and closing lid that passes or interrupts the air flow at the opening, and an anchor member having a top portion which is connected to the flap ventlid. The anchor member also has a length dimension that is longer than the depth of the air removing hole. The flap ventlid can be installed in the air removing hole such that at least a part of the flap ventlid contacts the design surface of the tire mold by inserting the anchor member into the air removing hole and bending the end portion of the anchor member that projects from the opening of the air removing hole on the side opposing the design surface at the opening of the air removing hole on the side opposing the design surface (hereinafter sometimes referred to as "the second invention").

According to another embodiment of the present invention, a flap ventlid installation structure is provided, in which a flap ventlid, which functions as an opening and closing lid that passes or interrupts the flow of air at an opening of an air removing hole formed on the design surface of a tire mold is provided at the opening of the air removing hole. The flap ventlid installation assembly according to the first invention is installed such that at least a part of the flap ventlid contacts the design surface of the tire mold by press fitting the anchor member into the air removing hole (hereinafter sometimes referred to as "the third invention").

According to another embodiment of the present invention, a flap ventlid installation structure is provided in which a flap ventlid, which functions as an opening and closing lid that passes or interrupts the air flow at an opening of an air removing hole formed on the design surface of a tire mold, is provided at the opening of the air removing hole. The flap ventlid installation assembly according to the second invention is installed such that at least a part of the flap ventlid contacts the design surface of the tire mold by inserting the anchor member into the air removing hole and bending the end portion of the anchor member that projects from the opening of the air removing hole on the side opposing the design surface at the opening of the air removing hole on the side opposing the design surface (hereinafter sometimes referred to as "the fourth invention").

According to a first aspect of the present invention, a flap ventlid installation structure according to the third or fourth inventions is provided, wherein the flap ventlid installation assembly is installed such that when the flap ventlid installation assembly is drawn out from the air removing hole, the anchor member rakes out foreign matter, such as tire molding material debris or rubber burrs, present in the air removing hole.

According to a second aspect of the present invention, the flap ventlid installation structure according to the first aspect is provided, wherein the anchor member has a projection for raking out the foreign matter.

According to a third aspect of the present invention, the flap ventlid installation structure according to the first or second aspects is provided, wherein the anchor member is made of a material to which the foreign matter present in the air removing hole readily adheres or such a material is coated on a surface of the anchor member.

According to a fourth aspect of the present invention, the flap ventlid installation structure according to any of the first to third aspects is provided, wherein the material is copper or a copper alloy.

According to yet another embodiment of the present invention, a method for installing a flap ventlid, which functions as an opening and closing lid that passes or interrupts the air flow at an opening of an air removing hole formed on the design surface of the mold is provided. The anchor member of the flap ventlid installation assembly according to the first invention is press fit into the air removing hole through the opening so that at least a part of the flap ventlid contacts the design surface of the tire mold, thereby installing the flap ventlid (hereinafter sometimes referred to as "the fifth invention").

According to another embodiment of the present invention, a method for installing a flap ventlid, which functions as an opening and closing lid that passes or interrupts the air flow at an opening of an air removing hole formed on the design surface of a tire mold, is provided. The flap ventlid installation assembly according to the second invention is installed such that at least a part of the flap ventlid contacts the design surface of the tire mold. The method comprises the steps of inserting the anchor member into the air removing hole and bending the end portion of the anchor member that projects from the opening of the air removing hole on the side opposing the design surface at the opening of the air removing hole on the side opposing the design surface (hereinafter sometimes referred to as "the sixth invention").

According to a fifth aspect of the present invention, a method for installing a flap ventlid according to the fifth or sixth inventions is provided, wherein the flap ventlid installation assembly is installed such that when the flap ventlid installation assembly is drawn out from the air removing hole, the anchor member takes out foreign matter present in the air removing hole.

According to a sixth aspect of the present invention, a method for installing a flap ventlid according to the fifth aspect is provided, wherein the anchor member has a projection for raking out the foreign matter.

According to a seventh aspect of the present invention, a method for installing a flap ventlid according to the fifth or sixth aspects is provided, wherein the anchor member is made of a material to which the foreign matter present in the air removing hole readily adheres or such a material is coated on the surface of the anchor member.

According to an eighth aspect of the present invention, the method for installing a flap ventlid according to fifth, sixth or seventh aspects is provided, wherein the material is copper or a copper alloy.

According to another embodiment of the present invention, a mold for molding a tire, which is provided with a flap ventlid installation structure according to the third or fourth inventions or the first through fourth aspects, is provided (hereinafter sometimes referred to as "the seventh invention").

BRIEF DESCRIPTION OF THE DRAWINGS

FIG. 26(a) to FIG. 26(e) are explanatory drawings which show the steps in sequence of forming the flap ventlid installation assembly used in Example 4.

DETAILED DESCRIPTION OF THE INVENTION

Figure 1:
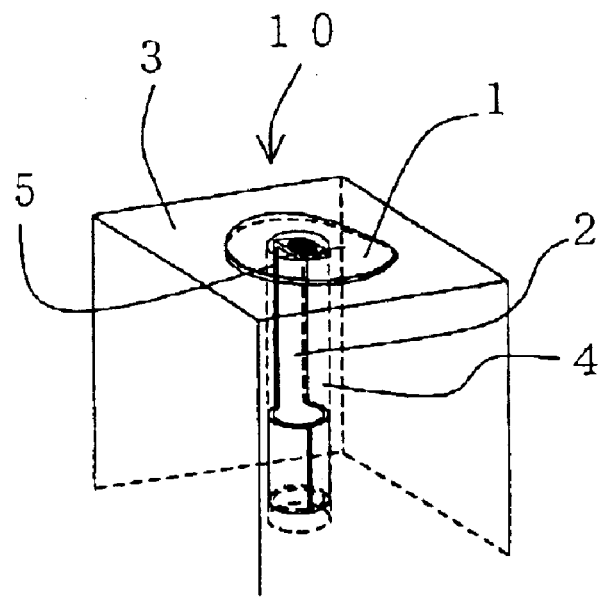
FIG. 1 is an oblique view which schematically shows one embodiment of the flap ventlid installation assembly installed in a mold for molding a tire according to the present invention (the first invention).

Embodiments of a flap ventlid installation assembly, an installed structure of the flap ventlid installation assembly, a method of installing the flap ventlid installation assembly, and a tire mold according to the present invention (the first invention to the seventh invention) will be specifically explained referring to the drawings.

Figure 2A:
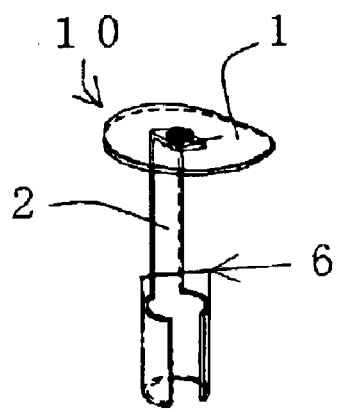
FIG. 2(a) and FIG. 2(b) are oblique views which show steps in sequence in one embodiment of installing the flap ventlid installation assembly in a tire mold according to the present invention (the first invention).
Figure 2B:
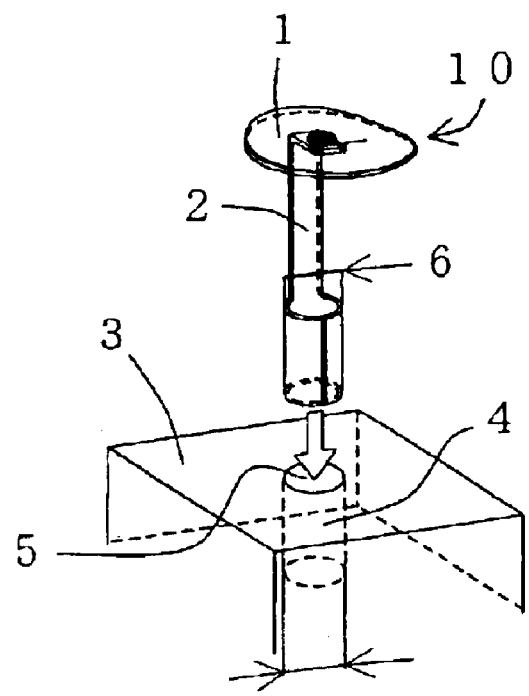

First, the flap ventlid installation assembly 10 according to one embodiment of the present invention (the first invention) will be explained. FIG. 1 shows a flap ventlid installation assembly 10 which is used for installing a flap ventlid 1 at an opening 5 of a venthole 4 formed on the design surface of a mold 3 for molding a tire ("a mold for molding a tire" is hereinafter sometimes referred to as "a tire mold"). The flap ventlid 1 functions as an opening and closing lid that passes or interrupts the air flow at the opening 5. As shown in FIG. 2(a), the flap ventlid installing assembly 10 of this embodiment of the present invention comprises a flap ventlid 1 and an anchor member 2. The top portion of the anchor member 2 is connected to the flap ventlid 1 and the anchor member 2 also has a longer portion 6 which cannot be inserted as it is into the venthole 4 through the opening 5 of the tire mold 3 (see FIG. 1). The shape of the longer portion 6 is capable of being press fit into the venthole 4 through the opening 5 by applying an external force that causes elastic deformation of the longer portion 6 such that it is capable of being inserted into the venthole 4 through the opening 5 as shown in FIG. 2(b). The flap ventlid 1 can be installed such that at least a part of the flap ventlid 1 contacts the design surface of the tire mold 3 by press fitting the anchor member 2 into the venthole 4 as shown in FIG. 1.

In this manner, the flap ventlid 1 can be simply installed in the tire mold 3, and the flap ventlid 1 can prevent the occurrence of spew (whisker projections) and burred extensions on the tire surface during tire molding and can retain the desired initial performance or external appearance of the obtained tire in a satisfactory state.

The flap ventlid installation assembly 10 of this embodiment can be formed, for example, in the following manner. First, an anchor material 7 is formed which has such a shape as shown in FIG. 3(*a*), for example, wherein the width of one end portion is narrower than the inner diameter of the venthole 4 (see FIG. 1) of the tire mold 3 (see FIG. 1) and the width of the other end portion is wider than the inner diameter of the venthole 4 (see FIG. 1). Such anchor material 7 can be formed by cutting a steel material having a suitable strength and spring characteristics and can be welded with the flap ventlid 1 (see FIG. 1). Although the anchor material 7 is not particularly limited, spring steels, precipitation hardening stainless steels, precipitation hardening nickel alloys, etc, for example, may be used. Among these materials, precipitation hardening stainless steels and precipitation hardening nickel alloys which can maintain high strength characteristics for a long time in a temperature range of about 150–200° C. are suitable because the tire mold 3 (see FIG. 1) is used and held for a long time in the above temperature range.

The thickness of the anchor material 7 varies depending on the diameter of the opening 5 (see FIG. 1) of the venthole 4 (see FIG. 1) into which the anchor member 2 is press fit. For example, in the case where the diameter of the opening 5 is about 0.8–1.6 mm, the thickness of the anchor material 7 is preferably about 0.05–0.40 mm. In this case, however, if the thickness of the anchor material 7 is less than 0.05 mm, a sufficient self-pressing function sometimes cannot be developed as used for anchor member 2 (see FIG. 1), and if it is more than 0.40 mm, the opening 5 (see FIG. 1) of the venthole 4 is clogged with its thickness (see FIG. 1), and sufficient ventilation sometimes cannot be assured during tire molding.

The anchor material 7 is subjected to bending to form a shape as shown in FIG. 3(*b*), namely, to form an anchor member 2 which has a longer portion which cannot be inserted as it is into the venthole 4 (see FIG. 1) through the opening 5 (see FIG. 1) of the tire mold 3 (see FIG. 1) and which has such a shape that is capable of being press fit into the venthole 4 through the opening 5 by applying an external force to cause elastic deformation of the longer portion 6. The lower part 9 of the anchor member 2 subjected to bending develops a frictional force with inner wall surface of the venthole 4 (see FIG. 1) when press fit into the venthole 4 (see FIG. 1) and this part is actually fixed in the tire mold 3 (see FIG. 1). Furthermore, the upper part 8 of the anchor member 2 is bent so that the flap ventlid 1 can be easily welded thereto. This flap ventlid 1 is preferably made of a flexible material which is chemically inert with respect to the tire raw materials before molding (green tire), which does not fusion bond thereto and which can be repeatedly used at a temperature of 100–2000° C. For example, iron alloys (various steel materials) or nickel alloys can be used. Furthermore, those which can have a thinner thickness are preferred such that traces of the flap ventlid 1 do not cause any problems with respect to the appearance of the tire.

Next, as shown in FIG. 3(*c*), the flap ventlid 1 is temporarily placed on the upper part 8 of the anchor member 2. It is preferred to bend the flap ventlid 1 in such a shape to effectively function as an opening and closing lid when installed in the tire mold 3 (see FIG. 1). Then, as shown in FIG. 3(*d*), the flap ventlid 1 is welded to the upper part 8 of the anchor member 2 using a welding machine 11, etc. The welding of the flap vent lid 1 to the anchor member 2 may be carried out after installing the anchor member 2 in the tire mold 3 (see FIG. 1), but is preferably carried out before installation in the tire mold 3 (see FIG. 1) because positioning of the flap ventlid land welding operation can be simply performed.

Next, as shown in FIG. 3(*e*), the shape of the anchor member 2 is adjusted so that it has a longer portion 6 which cannot be inserted as it is into the venthole 4 (see FIG. 1) through the opening 5 (see FIG. 1) of the tire mold 3 (see FIG. 1), but which has a shape that is capable of being inserted into the venthole 4 through the opening 5 by applying an external force to cause elastic deformation of the longer portion 6. Thus, the flap ventlid installation assembly 10 is formed.

Furthermore, as shown in FIG. 4(*a*), the anchor member 2 can also be formed using a spring pin 12 having a given outer diameter and a steel thin plate tab 13. As the spring pin 12, commercially available spring pins (JIS B 2808), etc. May be suitably used. As shown in FIG. 4(*b*), the anchor member 2 is formed by integrating the spring pin 12 and the steel thin plate tab 13 by welding, etc., and as shown in FIGS. 4(*c*) and 4(*d*), the flap ventlid 1 is welded to the resulting anchor member 2, whereby the flap ventlid installation assembly 10 can be formed.

Furthermore, for the formation of the flap ventlid installation assembly 10, the spring pin 12 is preferably welded to the steel thin plate tab 13 or the flap ventlid 1 to the anchor member 2 by resistance welding (with a very small current), such as percussion welding, because traces of the welding hardly remain and no welding fillers, such as welding rods, are needed.

Usually, the inner diameter of the opening 5 of the venthole 4 formed in the tire mold 3 as shown in FIG. 1 is about 0.8–1.6 mm, and the outer diameter of the flap ventlid 1, which has a shape that hardly affects the design surface of the tire mold 3, is about 2.5–4.0 mm. Therefore, the shape of the anchor member 2 used in this embodiment is not limited to the one explained above, and can be any shape having such a size that is capable of being welded with the flap ventlid 1 and imparting the function of self-bonding to the inner wall surface of the venthole 4.

Furthermore, the flap ventlid installation assembly of this embodiment may be such one in which the end portion of the anchor member 2, that is, the opposite of the end portion to which the flap ventlid 1 is welded, is bent so that the anchor member 2 cannot be inserted as it is into the venthole 4 but can be press fit into the venthole 4 after elastic deformation occurs by applying an external force to the anchor member 2, or may be such one in which the anchor member 2 is bent at two or more portions. Furthermore, as shown in FIG. 5(*c*) and FIG. 5(*d*), the flap ventlid installation assembly of this embodiment may be such that two or more anchor members 2 are connected to one flap ventlid 1, and the opposing end portion of at least one of the anchor members 2 may be bent. Moreover, as shown in FIG. 5(*e*), the flap ventlid installation assembly of this embodiment may be such that the anchor member 2 is bent at two or more portions. In the flap ventlid installation assemblies 10 shown in FIG. 5(*a*) to FIG. 5(*e*), the area including the bent portion of the anchor member 2 forms the longer portion 6 in this embodiment, and the anchor member 2 is elastically deformed by applying an external force to the longer portion 6 and press fitting it into the venthole 4, and thus, the flap ventlid installation assemblies 10 can be installed in the tire mold 3. According to the construction mentioned above, a simple structure is obtained, and press fitting the anchor member 2 into the venthole 4 is performed easily while occurrences of the flap ventlid falling off at the time of molding can be effectively inhibited.

Figure 6A:
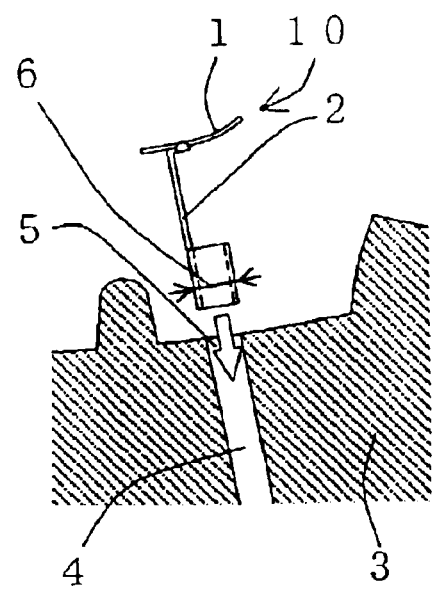
FIG. 6(a) and FIG. 6(b) are explanatory drawings which show steps in sequence in one embodiment of installing the flap ventlid installation assembly used for flap ventlid installing structure in a tire mold according to the present invention (the third invention).
Figure 6B:
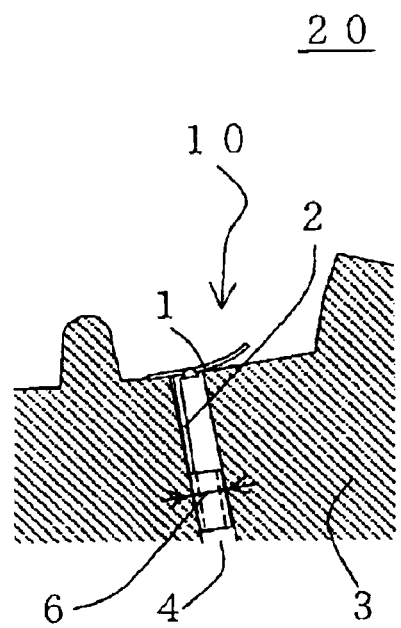

Next, the installation structure of the flap ventlid according to one embodiment of the present invention (the third invention) will be explained. As shown in FIG. 6(a) and FIG. 6(b), the installation structure 20 of the flap ventlid according to this embodiment is characterized in that the flap ventlid installation assembly 10 constructed in the same manner as the flap ventlid installing assembly 10 shown in FIG. 1 is installed such that at least a part of the flap ventlid 1 contacts the design surface of the tire mold 3 by press fitting the anchor member 2 into the venthole 4.

As mentioned before, the anchor member 2 of the flap ventlid installation assembly 10 has a longer portion 6 which cannot be inserted as it is into the venthole 4 and which simultaneously has a shape that is capable of being press fit into the venthole 4 from the opening 5 after being elastically deformed by applying an external force. Therefore, in this embodiment, when the anchor member 2 is press fit into the venthole 4, the length of the longer portion 6 is reduced, and, due to the restoring force of the reduced longer portion 6 per se, the friction force with the inner wall surface of the venthole 4 increases. Thus, the flap ventlid installation assembly 10 can be installed in the tire mold 3 in firmly fixed state.

In this manner, a flap ventlid 1 can be simply installed in the mold 3, whereby the flap ventlid can prevent the occurrence of spew (whisker projections) and burred extensions on a tire surface during tire molding and retains the desired initial performance or the external appearance of the obtained tire in a satisfactory state. Furthermore, the flap ventlid 1 can also be simply installed in a tire mold 3 made of an aluminum alloy or the like to which the flap ventlid 1 cannot be directly welded. Moreover, since scaffolds for welding to the tire mold 3 and caulking operations of the flap ventlid 1 are not required per se, breakage of the design surface of the tire mold can be inhibited. Further, in this embodiment, the flap ventlid installation assembly 10 is removable, so that when the flat ventlid 1 must be changed due to breakage or the like, it can be removed without leaving defects such as welding traces in the tire mold 3, and the flap ventlid installation assembly 10 can be simply installed merely by inserting it in the tire mold 3.

Figure 7A:
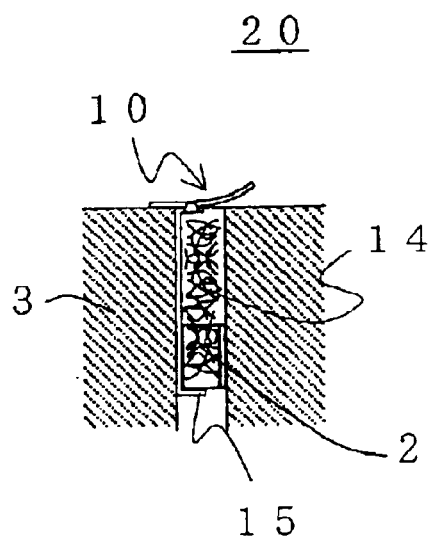
FIG. 7(a) and FIG. 7(b) are explanatory drawings which show behavior in sequence of steps in one embodiment of drawing out the flap ventlid installation assembly used for flap ventlid installation structure from a tire mold, thereby raking out foreign matter accumulated in the venthole according to the present invention (the third invention).
Figure 7B:
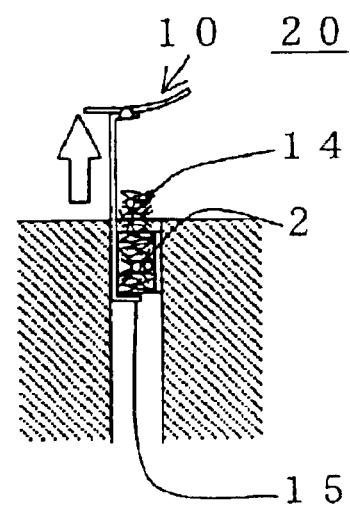

Moreover, in this embodiment, it is preferred that, as shown in FIG. 7(a) and FIG. 7(b), the flap ventlid installation structure 20 is provided such that when the flap ventlid installation assembly 10 installed in the tire mold 3 is drawn out of the venthole 4, the anchor member 2 rakes out foreign matter 14 present in the venthole 4. Specifically, a flap ventlid installation assembly 10 in which the flap ventlid 1 is welded to an anchor member 2 having a projection 15 for raking out foreign matter 14, such as tire molding material debris, and which is installed in the tire mold 3 is suitable.

When tires are repeatedly molded by the tire mold 3, foreign matter 14, such as rubber burrs, accumulate in the venthole 4, and sometimes clog the venthole. For example, when the flap ventlid 1 is directly welded to the tire mold 3, the foreign matter 14 must be removed after the flap ventlid 1 is peeled off from the tire mold 3, but in the flap ventlid installation structure 20 of this embodiment, the flap ventlid is removably installed in the tire mold 3 by press fitting the anchor member 2 into the tire mold 3, and the foreign matter 14 accumulated in the venthole 4 can be raked out merely by drawing the anchor member 2 out of the venthole 4. Therefore, the foreign matter 14, which cause clogging, can easily be removed without leaving welding traces in the tire mold 3.

Moreover, in this embodiment, in place of forming the projection 15 mentioned above, the anchor member 2 may be made of a material to which the foreign matter 14 present in the venthole 4 readily adheres or such material may be coated on the surface of the anchor member. As the material, copper and copper alloys may be suitably used. In this manner, the foreign matter 14 accumulated in the venthole 4 can be readily raked out merely by drawing the flap ventlid installation assembly 10 out of the tire mold 3 without forming the anchor member 2 in a special shape (i.e., without forming the projection 15 or the like on the anchor member 2).

Hitherto, copper alloys have been considered unsuitable as materials of members constituting the tire mold 3 since they react with sulfur in the vulcanized rubber constituting the tire and hence are high in adhesion to the vulcanized rubber. In this embodiment of the present invention, however, the foreign matter 14 present in the venthole 4 can be easily removed by adhering to the anchor member 2 utilizing the heretofore undesirable characteristics of copper alloys mentioned above.

By using a beryllium-copper alloy as the material of the anchor member 2, in addition to the above effects, the stress of pressing the inner wall surface of the venthole 4 by the anchor member 2 that is press fit into the venthole 4 can be maintained for a long time. This is because while being kept at about 200° C., which is the temperature of using the tire mold 3, for a long time, the beryllium-copper alloy has aging induction deformation characteristics and age (precipitation) hardening gradually proceeds. Further, the alloy spontaneously deforms in the direction of the initially imparted strain. The flap ventlid installation assembly 10 can be firmly installed in the tire mold 3 by forming the anchor member 2 in such a shape that the longer portion is elastically shortened during the age-hardening reaction and is age-induction deformed, effectively utilizing the age-induction deformation characteristics of the beryllium-copper alloy.

In the case of the anchor member 2 being formed of the above-mentioned metal or alloys comprising a beryllium-copper alloy, the material of the flap ventlid 1 must be formed of a material that is weldable to the anchor member 2. As mentioned above, the flap ventlid 1 can be made of spring steel, precipitation hardening type stainless steel, precipitation hardening type nickel alloy, or the like. When the material of the anchor member 2 is a copper alloy, however, it is preferred to form the flap ventlid 1 using a nickel alloy since adhesion of various steel materials to copper alloys by welding is low.

Figure 4D:
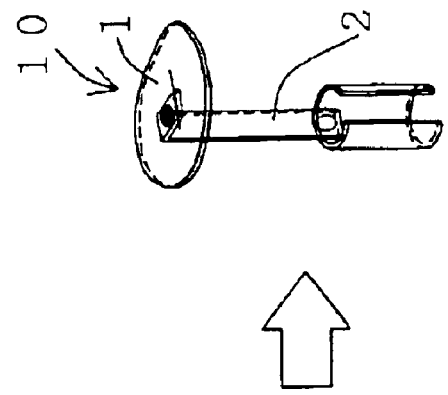
FIG. 4(a) to FIG. 4(d) are oblique views which show steps in sequence in another embodiment of forming the flap ventlid installation assembly according to the present invention (the first invention).
Figure 4C:
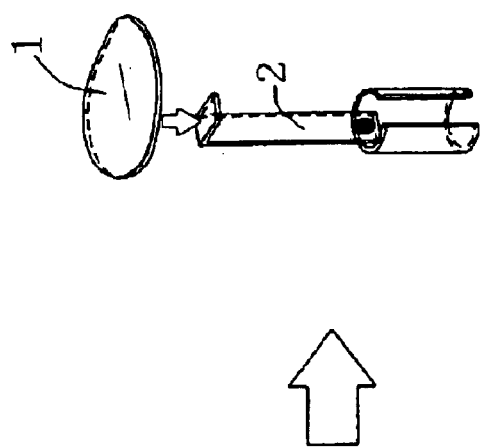
Figure 4B:
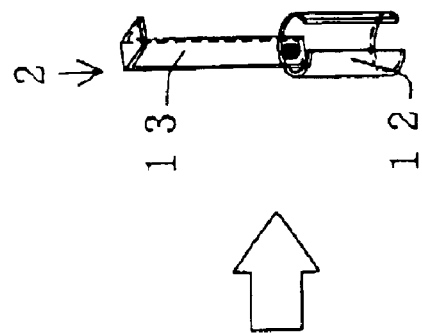
Figure 4A:
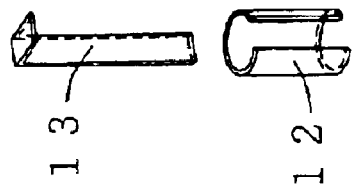
Figure 5A:
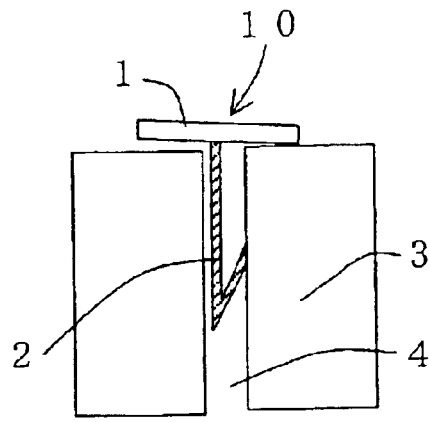
FIG. 5(a) to FIG. 5(e) are explanatory drawings which schematically show another embodiment of the flap ventlid installation assembly installed in a tire mold according to the present invention (the first invention).
Figure 5B:
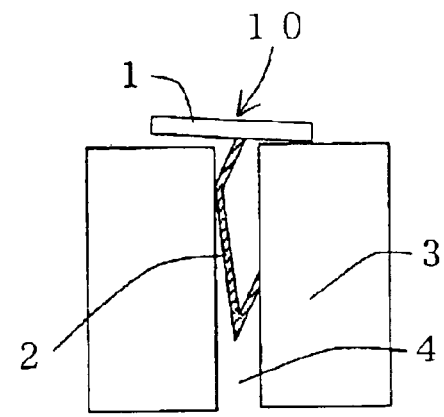
Figure 5C:
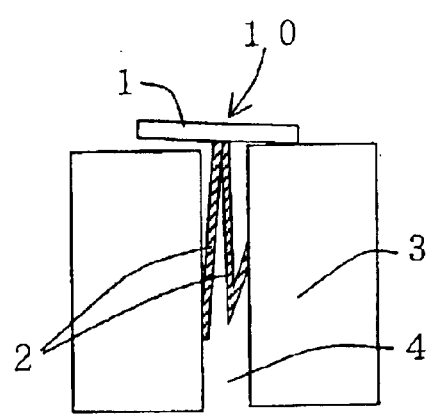
Figure 5D:
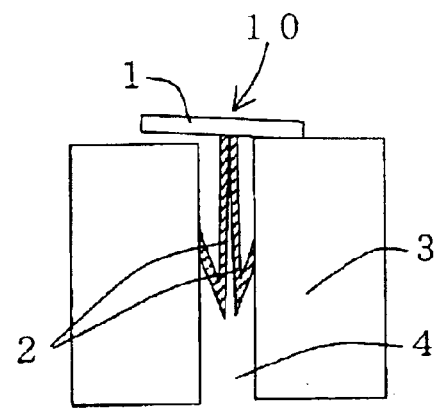
Figure 5E:
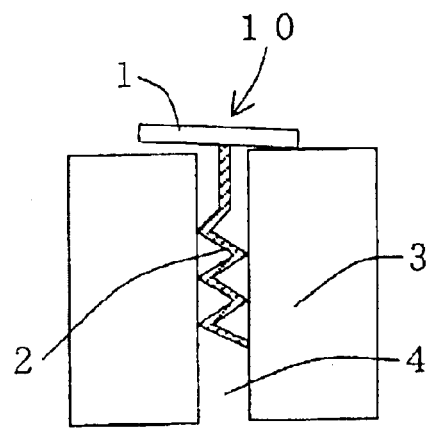
Figure 8A:
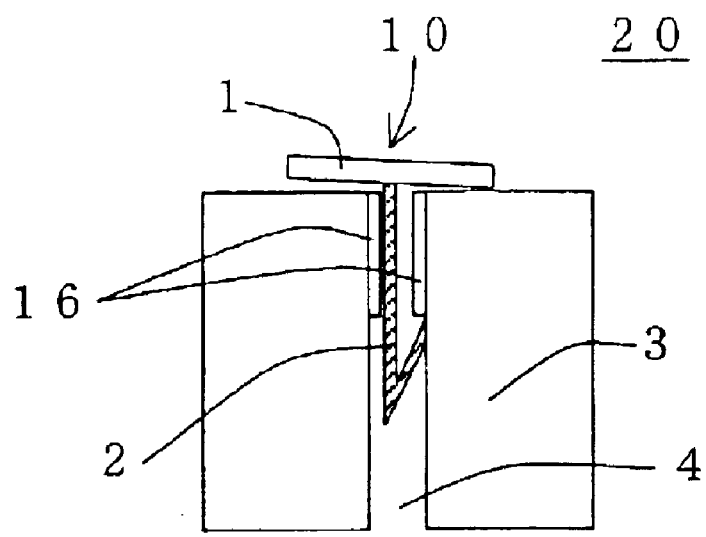
FIG. 8(a) and FIG. 8(b) are explanatory drawings which schematically show another embodiment of the flap ventlid installation structure according to the present invention (the third invention).
Figure 8B:
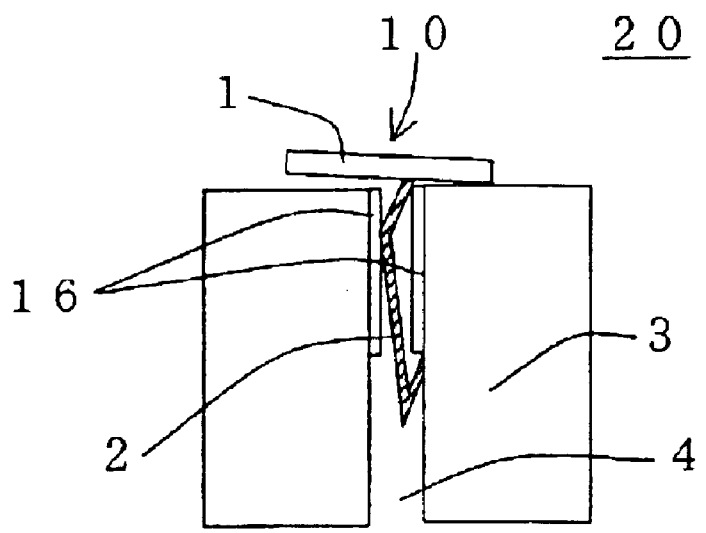

Further, in this embodiment, the flap ventlid installation assembly 10 as shown in FIG. 4(d) or the flap ventlid installation assemblies 10 as shown in FIG. 5(a) to FIG. 5(e), may be used for installation in the tire mold 3 (see FIG. 5(b)). In the case where the flap ventlid installation assemblies 10 shown in FIG. 5(a) to FIG. 5(e) are used, the flap ventlid installation structure 20 may be such that a cylindrical falling-inhibition member 16 having a piercing hole that has a smaller inner diameter than the inner diameter of the venthole 4, is provided in the venthole 4 of the tire mold 3, and the anchor member 2 is press fit into the piercing hole of the falling-inhibition member 16 as shown in FIG. 8(a) and FIG. 8(b). In this manner, for example, in the case where the anchor member 2 falls off of the venthole 4 during tire molding, the bent end portion of the anchor member 2 is stopped by the end face of the falling-inhibition member 16 opposing the design surface side of the tire mold 3, whereby the flap ventlid installation assemblies 10 can be effectively inhibited from falling off.

Figure 9:
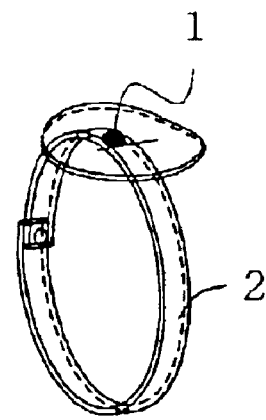
FIG. 9 is an oblique view which shows another embodiment of the flap ventlid installation assembly according to the present invention (the third invention).

Next, the flap ventlid installation assembly 10 according to another embodiment of the present invention (the first invention) will be explained. As shown in FIG. 9, the flap ventlid installation assembly 10 of this embodiment comprises a flap ventlid 1 and an anchor member 2, the top portion of which is connected to the flap ventlid 1. The anchor member 2 used for the flap ventlid installation assembly 10 of this embodiment is in the form of a ring prepared by connecting both end portions of a strip-like thin plate.

Figure 10A:
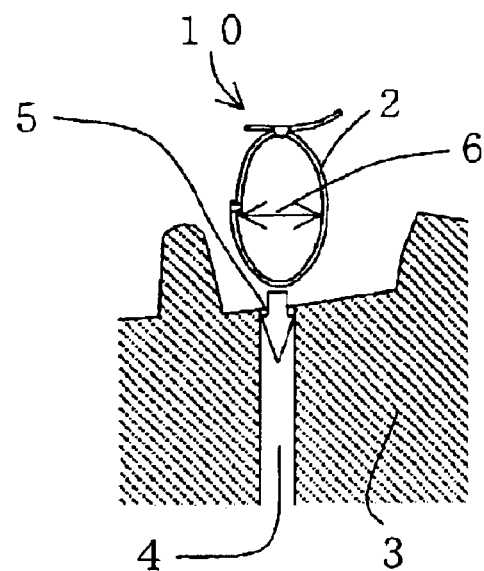
FIG. 10(a) and FIG. 10(b) are explanatory drawings which show steps in sequence in another embodiment of installing the flap ventlid installation assembly in a tire mold according to the present invention (the first invention).
Figure 10B:
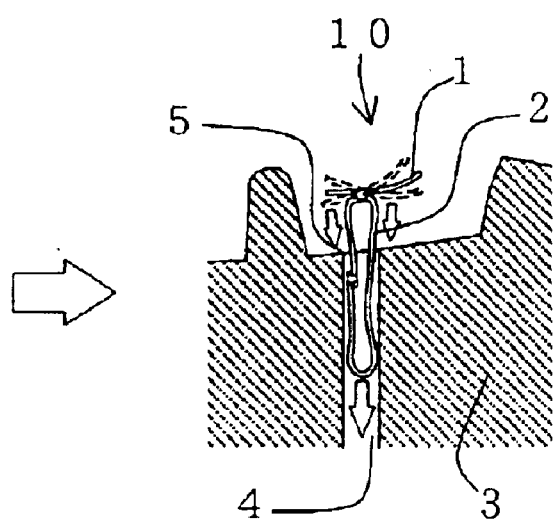

As shown in FIG. 10(a), this ring-shaped anchor member 2 has a longer portion 6 which cannot be inserted as it is into the venthole 4 through the opening 5 of the tire mold 3 but which has such a shape that is capable of being press fit into the venthole 4 through the opening 5 by applying an external force to cause elastic deformation of the longer portion 6 as shown in FIG. 10(b). Therefore, in the flap ventlid installation assembly 10 of this embodiment, the flap ventlid 1 can be installed such that at least a part of the flap ventlid 1 contacts the design surface of the tire mold 3 by press fitting the anchor member 2 into the venthole 4.

In this manner, the flap ventlid 1 can be simply installed in the tire mold 3, and can prevent the occurrence of spew (whisker projections) and burred extensions on a tire surface during tire molding and can retain the desired initial performance or external appearance of the obtained tire in a satisfactory state.

As materials used in this embodiment, the same materials as constituting the flap ventlid installing assembly 10 shown in FIG. 1 may be used.

Figure 11:
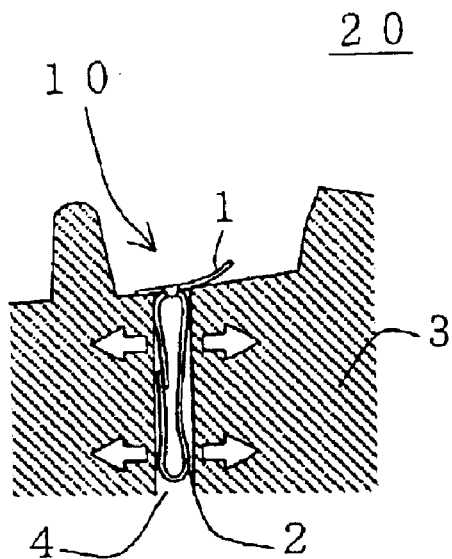
FIG. 11 is an explanatory drawing which schematically shows one embodiment of the flap ventlid installation assembly installed in a tire mold according to the present invention (the first invention).

Next, a flap ventlid installation structure according to another embodiment of the present invention (the third invention) will be explained. As shown in FIG. 11, the flap ventlid installation structure 20 according to this embodiment is characterized in that the flap ventlid installation assembly 10, constructed in the same manner as the flap ventlid installing assembly 10 shown in FIG. 9, is installed such that at least apart of the flap ventlid 1 contacts the design surface of the tire mold 3 by press fitting the anchor member 2 into the venthole 4.

In this manner, the flap ventlid can be simply installed in the tire mold 3 and can prevent the occurrence of spew (whisker projections) and burred extensions on a tire surface during tire molding and can retain the desired initial performance or external appearance of the obtained tire in a satisfactory state. Furthermore, the flap ventlid 1 can also be simply installed in a tire mold 3 made of an aluminum alloy or the like to which the flap ventlid 1 cannot be directly welded. Moreover, since scaffolds for welding the tire mold 3 and caulking operations of the flap ventlid 1 are not required per se, breakage of the design surface of the tire mold can be inhibited. Further, in this embodiment, the flap ventlid installation assembly 10 is removable, such that when the flat ventlid 1 must be changed due to breakage or the like, it can be removed without leaving shape defects such as welding traces in the tire mold 3, and a new flap ventlid installing assembly 10 can be simply installed merely by inserting it in the tire mold 3.

Figure 12A:
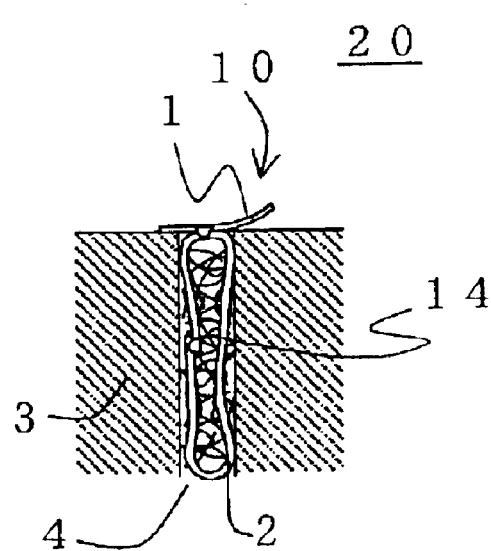
FIG. 12(a) and FIG. 12(b) are explanatory drawings which show the behavior, in a sequence of steps, according to another embodiment, when the flap ventlid installation assembly is drawn out of the venthole, thereby raking out foreign matter accumulated in the venthole according to the present invention (the third invention).
Figure 12B:
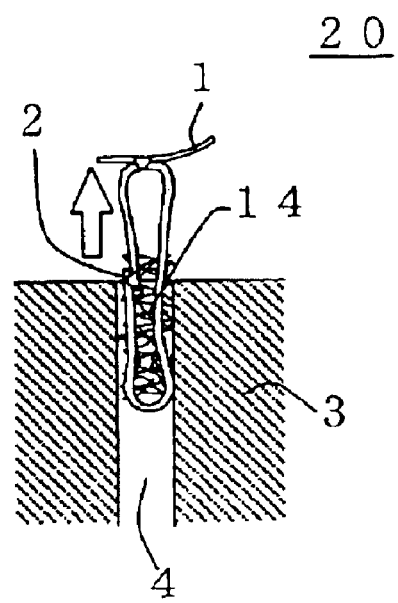

Moreover, in this embodiment, it is preferred that, as shown in FIG. 12(a) and FIG. 12(b), the flap ventlid installation assembly 10 is provided such that when the flap ventlid installation assembly 10 is drawn out from the venthole 4, the anchor member 2 rakes out foreign matter 14 accumulated in the venthole 4. When the ring-shaped anchor member 2 used in this embodiment is installed by press fitting in the venthole 4, this is deformed to have an undercut shape, and by drawing this deformed anchor member 2 out of the venthole 4, any foreign matter 14 that has accumulated in the venthole 4 can be raked out simultaneously.

Moreover, in this embodiment, the anchor member 2 is preferably made of a material to which the foreign matter 14 accumulated in the venthole 4 readily adheres or such a material is preferably coated on the surface. Copper and copper alloys may be suitably used as the material.

Figure 13:
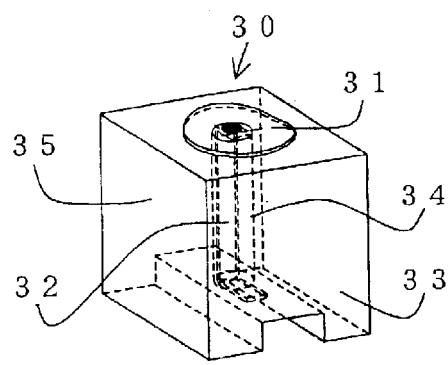
FIG. 13 is an oblique view which schematically shows one embodiment of the flap ventlid installation assembly installed in a tire mold according to the present invention (the second invention).
Figure 14:
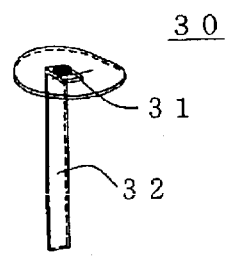
FIG. 14 is an oblique view which shows one embodiment of the flap ventlid installation assembly according to the present invention (the second invention).
Figure 15A:
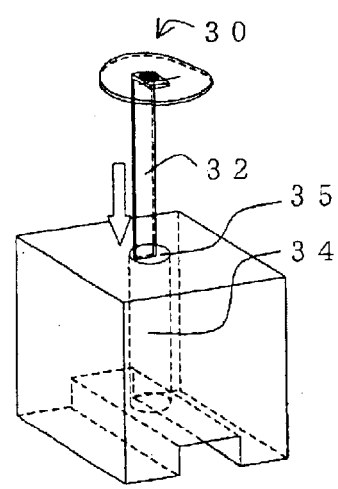
FIG. 15(a) to FIG. 15(c) are oblique views which show steps in sequence in one embodiment of installing the flap ventlid installation assembly in a tire mold according to the present invention (the second invention).
Figure 15B:
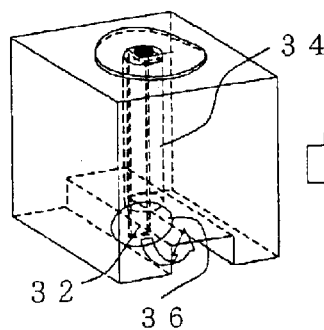
Figure 15C:
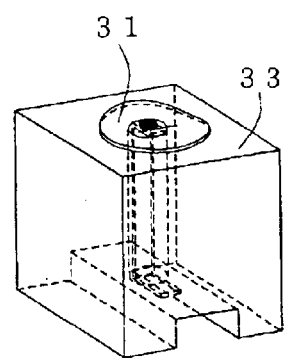

Next, a flap ventlid installation assembly according to another embodiment of the present invention (the second invention) will be explained. FIG. 13 shows a flap ventlid installation assembly 30 which is used for installing a flap ventlid 31, which functions as an opening and closing lid that passes or interrupts air flow at the opening 35 of a venthole 34 formed on the design surface of a tire mold 3. As shown in FIG. 14, the flap ventlid installation assembly 30 of this embodiment comprises a flap ventlid 31 and an anchor member 32, the top portion of which is connected to the flap ventlid 31. The anchor member 32 also has a length dimension that is longer than the depth of the venthole 34 (see FIG. 13). The flap ventlid 31 can be installed such that at least a part of the flap ventlid 31 contacts the design surface of the tire mold 33, as shown in FIG. 15(c), by inserting the anchor member 32 of the flap ventlid installation assembly 30 into the opening 35 of the venthole 34 from the design surface, as shown in FIG. 15(a), and bending the end portion of the anchor member 32 that projects from the opening 36 of the venthole 34 on the other side of the mold opposing the design surface at the opening 36 of the venthole 34 on the side opposing the design surface, as shown in FIG. 15(b).

In this manner, the flap ventlid 31 can be simply installed in the tire mold 33 and can prevent the occurrence of spew (whisker projections) and burred extensions on a tire surface during tire molding and can retain the desired initial performance or external appearance of the obtained tire in a satisfactory state.

Figure 16A:
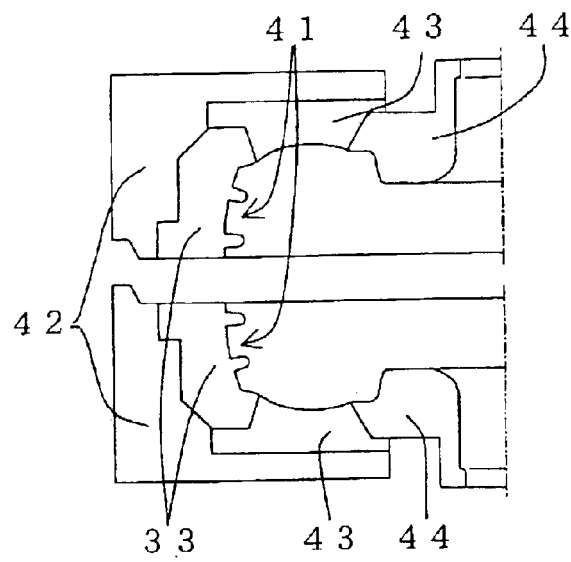
FIG. 16(a) and FIG. 16(b) are explanatory drawings which show one embodiment of a tire mold including the flap ventlid installation structure according to the present invention (the fourth invention).
Figure 16B:
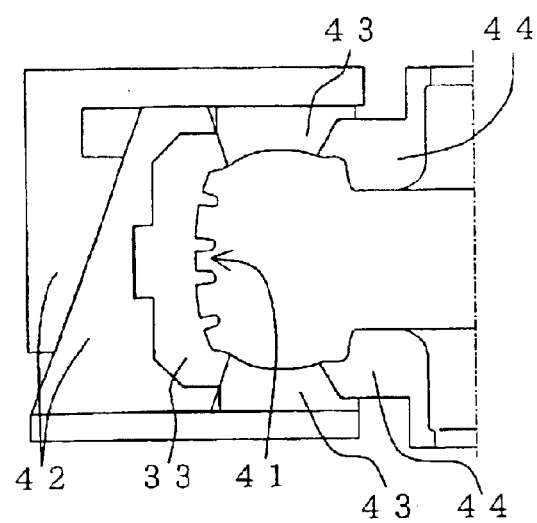
Figure 17:
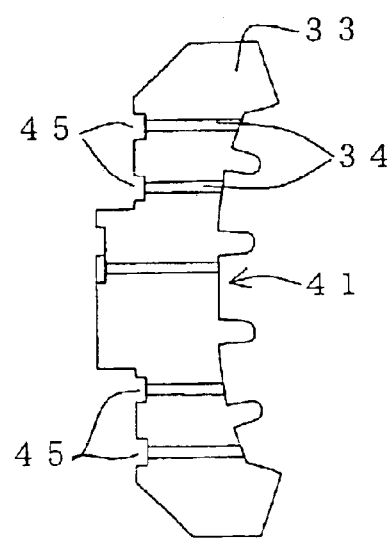
FIG. 17 is an explanatory drawing which shows one embodiment of a tire mold including the flap ventlid installation structure according to the present invention (the fourth invention).

In general, the tire mold 33 is used in such a manner that the design surface 41 of the tire mold 33 is held by a back mold 42, as shown in FIG. 16(a) and FIG. 16(b). FIG. 16(a) shows a 2P tire mold type (one cast ring type) and FIG. 16(b) shows a tire mold of sectional mold type (segmented mold type). In this tire mold 33, sufficient ventilation cannot be assured merely by piercing a venthole (not shown) from the design surface 41 of the tire mold 33 to the back surface, because the opening of the venthole (not shown) is closed by the back mold 42 which surface-contacts the back surface side. Therefore, as shown in FIG. 17, ordinarily, an air escaping groove portion 45 that is directly connected to the venthole 34 is formed on the back surface side (outer peripheral surface) of the design surface 41 of the tire mold 33. In FIG. 16(a) and FIG. 16(b), the reference numeral 43 indicates a side wall and 44 indicates a bead ring. According to this embodiment, the anchor member 32 (see FIG. 13) is fixed utilizing the air escaping groove 45 formed on the back surface side of the design surface 41 of the tire mold 33.

Figure 3A:
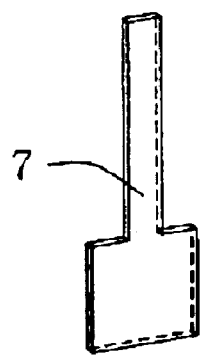
FIG. 3(a) to FIG. 3(e) are oblique views which show steps in sequence in one embodiment of forming the flap ventlid installation assembly according to the present invention (the first invention).
Figure 3B:
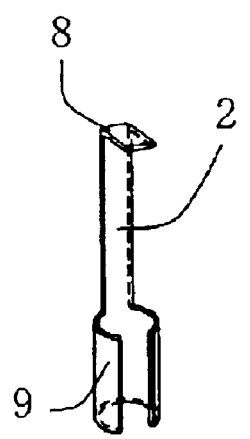
Figure 3C:
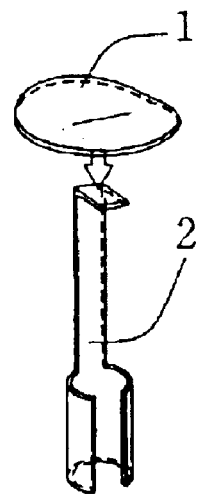
Figure 3D:
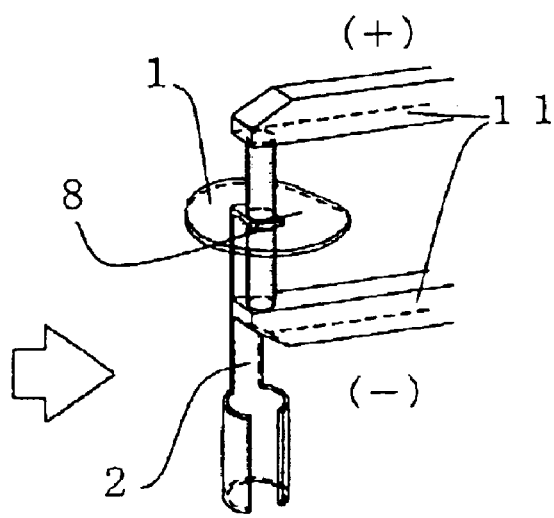
Figure 3E:
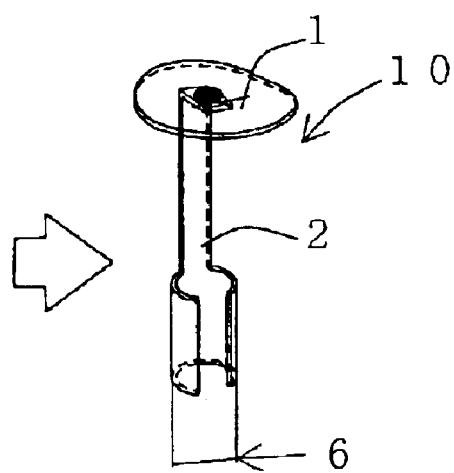
Figure 18:
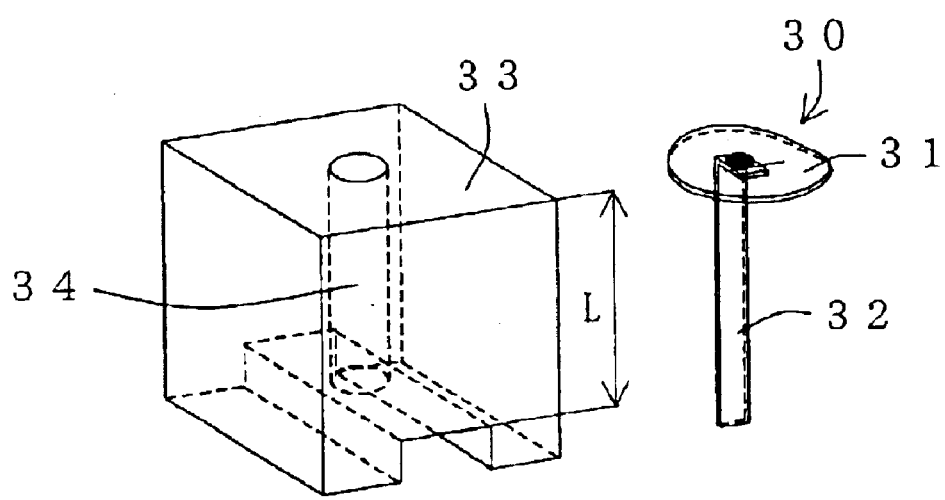
FIG. 18 is an oblique view which schematically shows one embodiment of a tire mold and a flap ventlid installation structure according to the present invention (the fourth invention).

As shown in FIG. 18, the flap ventlid 31 and the anchor member 32 used in this embodiment can be formed of the same materials as of the flap ventlid 1 and the anchor member 2 shown in FIG. 1. Furthermore, the anchor member 32 can be formed by using a plate-like anchor material having a length dimension that is longer than the length L of the venthole 34 of the tire mold 33 and by subjecting this anchor material to bending so that the flap ventlid 31 can be welded to the anchor material. This anchor material is preferably formed so that it is longer than the length L of the venthole 34 by the length of the portion to which the flap ventlid 31 is welded and the length of the portion that is bent at the opening 36 of the venthole 34 on the side opposing the design surface. The flap ventlid installation assembly 30 can be formed by welding the flap ventlid 31 to the portion of the anchor member 32 which is subjected to bending. Welding the flap ventlid 31 and the anchor member 32 can be performed by the same method as shown in FIG. 3(d) using a welding machine.

The flap ventlid installation assembly 30 formed in the above manner, however, is inferior with respect to the flap ventlid installation assembly 10 shown in FIG. 1 in maintenance and workability because the body of tire mold 33 (mold for the design surface) must be removed from the back mold 42 (see FIG. 16(a)) when the flap ventlid installation assembly 30 is changed, but the flap ventlid installation assembly 30 has advantages in that the possibility of the flap ventlid installation assembly 30 falling off from the tire mold 33 during removal of the molded tire can be considerably reduced, and the stability of tire molding can be improved.

Furthermore, in this embodiment, since the shape of the anchor member 32 is simple, production costs can be reduced. Moreover, the initial operation of installing the flap ventlid installation assembly 30 into the tire mold 33 is very easy, and changing the flap ventlid installation assembly 30 can be performed very easily (except for the operation of removing the mold in which the design surface 41 (see FIG. 16(a)) is formed from the back mold 42 (see FIG. 16(a))).

Figure 19A:
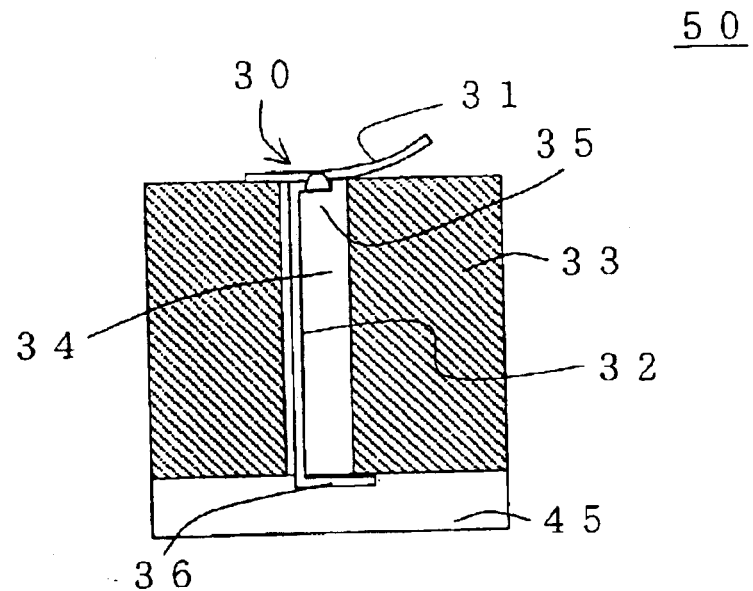
FIG. 19(a) and FIG. 19(b) are explanatory drawings which schematically show a state in one embodiment of installing a flap ventlid installation assembly to form the flap ventlid installation structure in a tire mold according to the present invention (the fourth invention).

Next, a flap ventlid installation assembly according to another embodiment of the present invention (the fourth invention) will be explained. As shown in FIG. 19(a), the flap ventlid installation structure 50 of this embodiment is characterized in that, as shown in FIG. 19(a), the flap ventlid installation assembly 30 (constructed in the same manner as the flap ventlid installation assembly 30 shown in FIG. 14) is installed such that at least a part of the flap ventlid 31 contacts the design surface of the tire mold 33 by inserting the anchor member 32 into the opening 35 of the venthole 34 from the design surface and bending the end portion of the anchor member 32 that projects from the opening 36 of the venthole 34 on the other side of the mold opposing the design surface at the opening 36 of the venthole 34 on the side opposing the design surface.

Figure 19B:
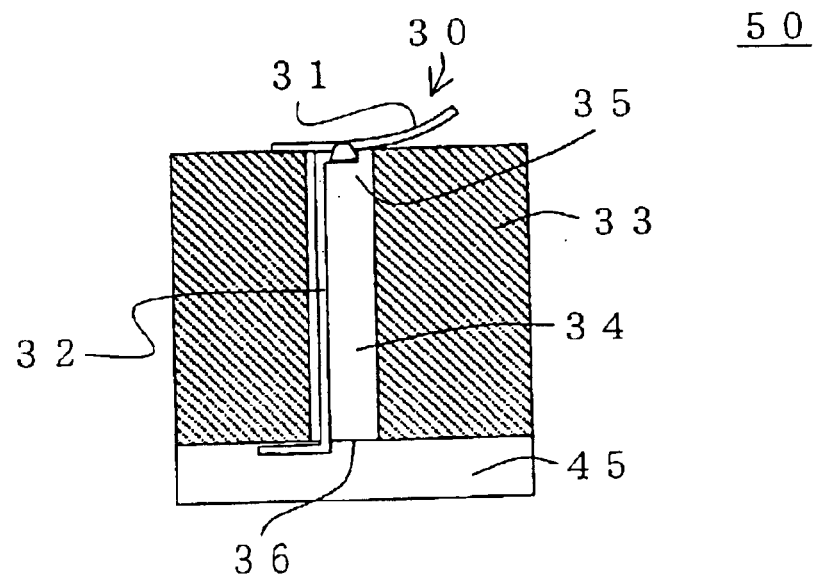

In this embodiment, the end portion of the anchor member 32 that projects from the opening 36 of the venthole 34 on the side opposing the design surface is bent at the opening 36 on the side opposing the design surface utilizing the air escaping groove 45 formed on the back surface side of the design surface of the tire mold 33 (see FIG. 17). In FIG. 19(a), the end portion of the anchor member 32 is bent in the same direction as the opening direction of the flap ventlid 31 which functions as an opening and closing lid, but may be bent in the opposite direction as shown in FIG. 19(b). Since the flap ventlid installation structure 50 shown in FIG. 19(b) is constructed in the same manner as the flap ventlid installing structure 50 shown in FIG. 19(a), the same reference numerals are given to the same elements and the explanations thereof have been omitted.

As shown in FIG. 19(a) and FIG. 19(b), according to the flap ventlid installation structure 50 of this embodiment, the flap ventlid 31 can be simply installed in a tire mold 33 and can prevent occurrence of spew (whisker projections) and burred extensions on a tire surface during tire molding and can retain the desired performance or external appearance of the obtained tire in a satisfactory state. Furthermore, the flap ventlid 31 can also be simply installed in the tire mold 33 made of an aluminum alloy or the like to which the flap ventlid 31 cannot be directly welded. Moreover, since scaffolds for welding to the tire mold 33 and caulking operations of the flap ventlid 31 are not required per se, breakage of the design surface of the tire mold 33 can be avoided. Further, in this embodiment, the flap ventlid installation assembly 30 is removable, such that when the flat ventlid 31 must be changed due to breakage or the like, it can be removed without leaving shape defects such as welding traces in the tire mold 33, and a new flap ventlid installation assembly 30 can be simply installed merely by inserting it in the tire mold 33.

Figure 20:
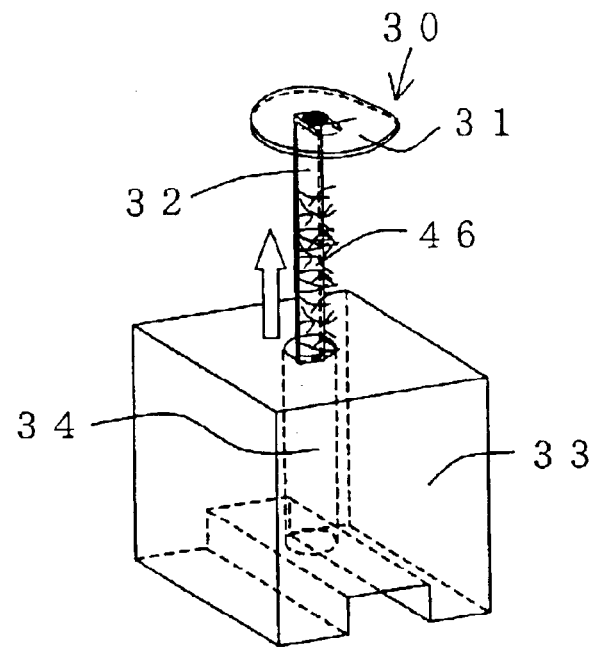
FIG. 20 is an oblique view which schematically shows the behavior in one embodiment when the flap ventlid installation assembly is drawn out of the venthole, thereby raking out foreign matter accumulated in the venthole according to the present invention (the fourth invention).

Moreover, in this embodiment, it is preferred that as shown in FIG. 20, the flap ventlid installation assembly 30 is provided such that when the flap ventlid installation assembly 30 is drawn out from the venthole 34, the anchor member 32 rakes out the foreign matter 46 accumulated in the venthole 34. A flap ventlid installation assembly 30 in which the flap ventlid 31 is welded to the anchor member 32 having projections 47 for raking out foreign matter 46 (see FIG. 20) is specifically suitable.

Figure 21:
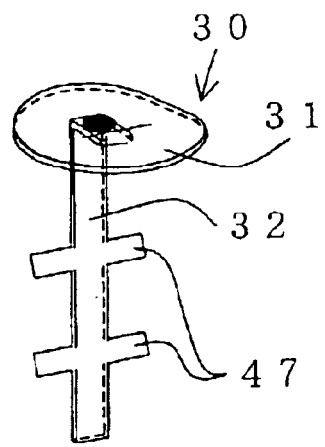
FIG. 21 is an oblique view which schematically shows one embodiment of the flap ventlid installation assembly of the flap ventlid installation structure in which a projection is formed on the anchor member according to the present invention (the fourth invention).

Moreover, in this embodiment, the anchor member 32 is preferably made of a material to which foreign matter 46 that has accumulated in the venthole 34 readily adheres or such a material is preferably coated on the surface of the anchor member 32, as shown in FIG. 20. Copper and copper alloys may be suitably used as the material. In this manner, the foreign matter 46 accumulated in the venthole 34 can readily be raked out merely by drawing the flap ventlid installation assembly 30 out of the tire mold 33 without forming the anchor member 32 in a special shape. Thus, the foreign matter 46 accumulated in the venthole 34 can be raked out without forming the projections 47 (see FIG. 21) or the like at the anchor member 32.

Hitherto, copper alloys have been considered unsuitable as materials of members constituting the tire mold 33 since they react with sulfur in the vulcanized rubber constituting the tire and hence are high in adhesion to the vulcanized rubber of tire, but in this embodiment, the foreign matter 46 (e.g., rubber burrs) accumulated in the venthole 34 can be easily removed by adhering to the anchor member 32 by virtue of the heretofore undesirable for tire-molding characteristics of copper alloys mentioned above.

In the case when the anchor member 32 is formed of the above-mentioned metal or alloys, the material of the flap ventlid 31 must be formed of a material that is weldable with the anchor member 32. The flap ventlid 31 can be made of spring steel, precipitation hardening type stainless steel, precipitation hardening type nickel alloy, or the like, but, for example, when the material of the anchor member 32 is a copper alloy, it is preferred to form the flap ventlid 31 using a nickel alloy because of the low adhesion of various steel materials to copper alloys by welding.

Next, a method for installing a flap ventlid according to the present invention (the fifth invention) will be explained. As shown in FIG. 6(a) and FIG. 6(b), the method for installing a flat ventlid 1, at the opening 5 of a venthole 4 formed on the design surface of the tire mold 3 includes the step of press fitting the anchor member 2 into the venthole 4 using the flap ventlid installation assembly 10 of the first invention (shown in FIG. 1) so that at least a part of the flap ventlid 1 contacts the design surface of the tire mold 3, thereby installing the flap ventlid 1.

By constructing as described above, the flap ventlid 1 can be simply installed in the tire mold 3 and can prevent the occurrence of spew (whisker projections) and burred extensions on a tire surface during tire molding and can retain the desired initial performance or external appearance of the obtained tire in a satisfactory state.

Furthermore, the flap ventlid installation assembly 10 used in this embodiment is not limited to the flap ventlid installing assembly 10 shown in FIG. 1, but may be of any shape so long as the flap ventlid installation assembly 10 comprises a flap ventlid 1 and an anchor member 2, the top portion of which is connected to the flap ventlid 1 and which has a longer portion 6 which cannot be inserted as it is into the venthole 4 from the opening 5 of the tire mold 3, but which has such a shape that is capable of being press fit into the venthole 4 from the opening 5 by applying an external force causing elastic deformation of the longer portion 6. For example, the flap ventlid installation assembly 10 as shown in FIG. 9 may be used.

Moreover, in the method for installing the flap ventlid of this embodiment, as shown in FIG. 7(a) and FIG. 7(b), it is preferred that the flap ventlid installation assembly 10 is installed such that when the flap ventlid installation assembly 10 is drawn out from the venthole 4, the anchor member 2 rakes out foreign matter 14 accumulated in the venthole 4. A method which comprises installing the flap ventlid installation assembly 10 in which the projection 15 for raking out the foreign matter 14 is provided on the anchor member 2 is specifically suitable.

Moreover, in this embodiment, it is preferred to use the flap ventlid installation assembly 10 in which the anchor member 2 is made of a material to which the foreign matter 14 that has accumulated in the venthole 4 readily adheres or such a material is coated on the surface of the anchor member 2. Copper and copper alloys may be suitably used as the material. In this manner, the foreign matter 14 accumulated in the venthole 4 can readily be raked out merely by drawing the flap ventlid installation assembly 10 out of the tire mold 3 without forming the anchor member 2 in a special shape.

Next, a method for installing a flap ventlid according to another embodiment of the present invention (the sixth invention) will be explained. As shown in FIG. 13, the method is for installing a flap ventlid at the opening 35 of the venthole 34 formed on the design surface of the tire mold 33 as shown in FIG. 15(c) using the flap ventlid installation assembly 30 shown in FIG. 14. The anchor member 32 is inserted in the venthole 34 so that at least a part of the flap ventlid 31 contacts the design surface of the tire mold 33 as shown in FIG. 15(a), and the end portion of the anchor member 32 that projects from the opening 36 of the venthole 34 on the other side of the mold opposing the design surface is bent at the opening 36 of the venthole 34 on the side opposing the design surface, as shown in FIG. 15(b).

By constructing as described above, the flap ventlid 31 can be simply installed in the tire mold 33 and can prevent the occurrence of spew (whisker projections) and burred extensions on the tire surface during tire molding and can retain the desired initial performance or external appearance of the obtained tire in a satisfactory state.

Furthermore, the flap ventlid installation assembly 30 used in this embodiment is not limited to the flap ventlid installation assembly 30 shown in FIG. 14, but may be of any shape so long as the flap ventlid installation assembly 30 comprises a flap ventlid 31 and an anchor member 32, the top portion of which is connected to the flap ventlid 31 and which has a length dimension that is longer than the depth of the venthole 34, and the flap ventlid 31 can be installed such that at least a part of the flap ventlid 31 contacts the design surface of the tire mold 33 by bending the end portion of the anchor member 32 that projects from the opening 36 of the venthole 34 on the other side of the mold opposing the design surface at the opening 36 of the venthole 34 on the side opposing the design surface.

In this embodiment, as shown in FIG. 20, it is preferred that the flap ventlid installation assembly 30 is installed such that when the flap ventlid installation assembly 30 is drawn out from the venthole 34, the anchor member 32 rakes out foreign matter 46 accumulated in the venthole 34. A method which comprises installing in the tire mold 33 the flap ventlid installation assembly 30 in which the projections 47 (see FIG. 21) for raking out foreign matter 46 are provided on the anchor member 32 is specifically suitable.

Moreover, in this embodiment, it is preferred to use the flap ventlid installing assembly 30, wherein the anchor member 32 is made of a material to which the foreign matter 46 accumulated in the venthole 34 readily adheres or such a material is coated on the surface. Copper and copper alloys may be suitable used as the material. In this manner, the foreign matter 46 accumulated in the venthole 34 can readily be raked out merely by drawing the flap ventlid installation assembly 30 out of the tire mold 33 without forming the anchor member 32 in a special shape.

Next, a tire mold according to one embodiment of the present invention (the seventh invention) will be explained. The tire mold includes the flap ventlid installation structure 20 as shown in FIG. 6(b). By constructing in this way, the flap ventlid 31 can prevent the occurrence of spew (whisker projections) and burred extensions on a tire surface during tire molding, can retain the desired initial performance or external appearance of the tire obtained at satisfactory state and can be easily exchanged during molding of tires.

The flap ventlid installation structure 20 used in this embodiment is not limited to the flap ventlid installation structure 20 shown in FIG. 6(b), and it may be of any shape so long as it is the flap ventlid installation structure of the present invention (the third invention and the fourth invention).

The flap ventlid installation assembly, the flap ventlid installation structure and installing method, and the tire mold explained above are not limited to those mentioned above and may be of any shape so long as the flap ventlid can be installed in the tire mold with the above-mentioned construction. For example, a wire can be used as the anchor member in place of the plates. Furthermore, the method for bonding the anchor member and the flap ventlid is not limited to welding.

EXAMPLES

Figure 22:
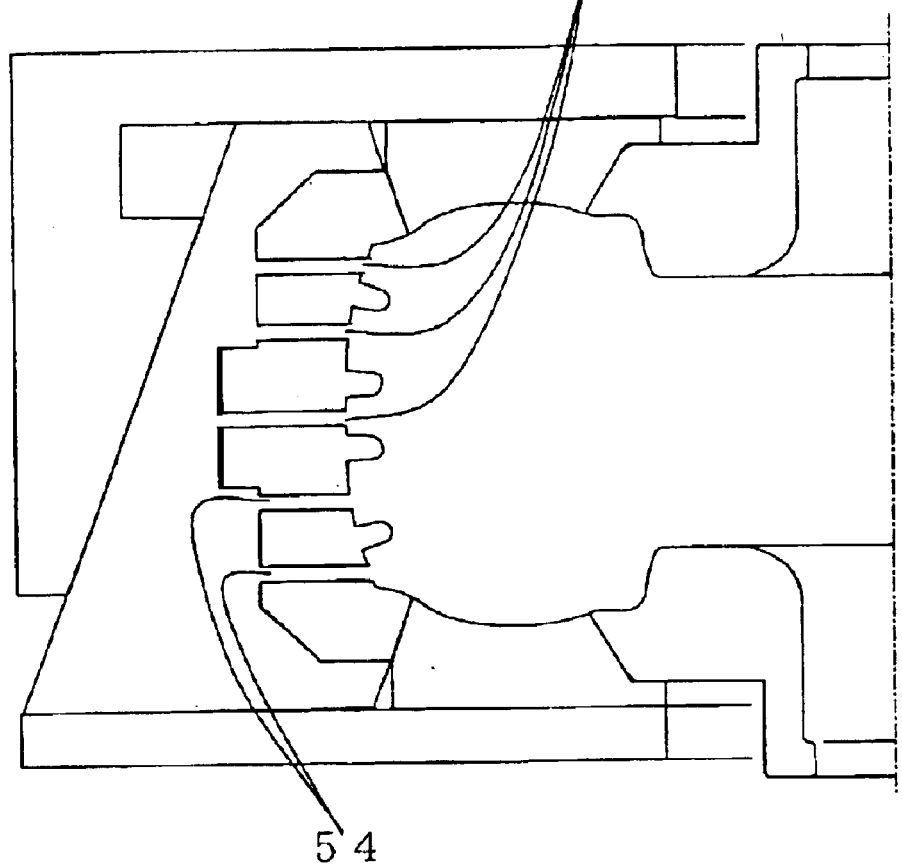
FIG. 22 is an explanatory drawing which shows the tire mold used in all examples.

The present invention will be explained more specifically by the following examples, which should not be construed as limiting the invention in any manner. In all of the examples, a sectional mold type (segmented mold type) tire mold 53 made of AC4C aluminum alloy (7% Si, 0.4% Mg, 1% Cu. 0.5% Fe with the remainder being Al) as shown in FIG. 22 was used. This tire mold 53 had a shape of 320 mm in overall height, $\phi$600 mm in inner diameter, $\phi$700 mm in outer diameter and 50 mm in wall thickness, and had about 1000 ventholes 54 of $\phi$1.2 mm in opening diameter of opening 55 which were formed in the design surface part. This tire mold 53 was made by a plaster casting method.

Example 1

Figure 23A:
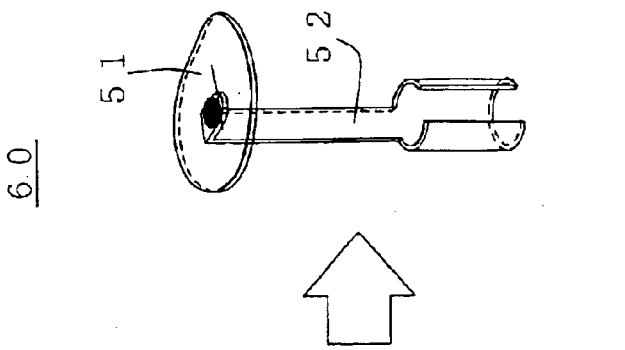
FIG. 23(a) to FIG. 23(d) are explanatory drawings which show the steps in sequence of forming the flap ventlid installation assembly used in Example 1.
Figure 23B:
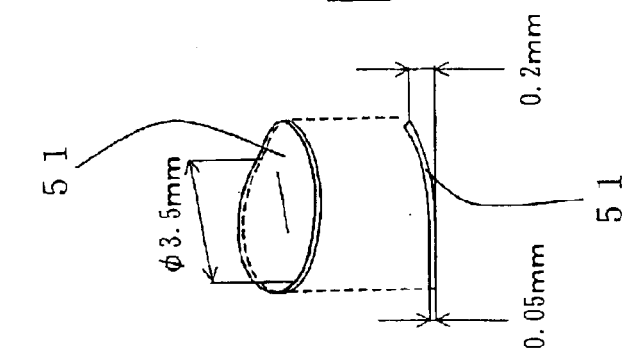

In Example 1, an anchor material 57 having the shape as shown in FIG. 23(a) was formed using a solution heat treated material (SUS 631), heated at 1000° C. for 1 hour and then quenched. Then, the anchor material 57 was bent in such a shape as shown in FIG. 23(b) and then subjected to age-hardening heat treatment to form a martensite anchor member 52. The age-hardening heat treatment for forming martensite was performed by heating at 760° C. for 90 minutes, then subjecting to air cooling, further heating at 560° C. for 60 minutes, and then subjecting to air cooling.

Figure 23C:
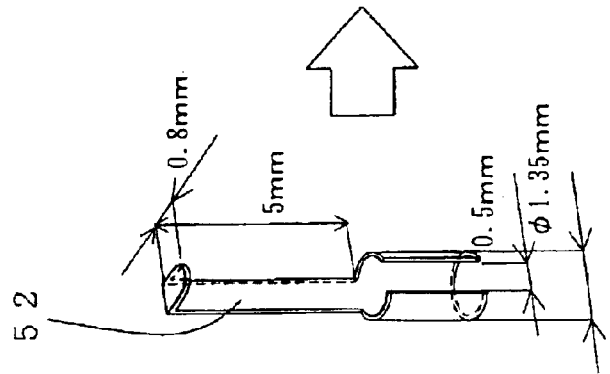

Next, a flap ventlid 51 having the shape as shown in FIG. 23(c) was formed. The flap ventlid 51 was formed of the same material as of the anchor member 52 (FIG. 23(b)) and subjected to the same age-hardening treatment.

Figure 23D:
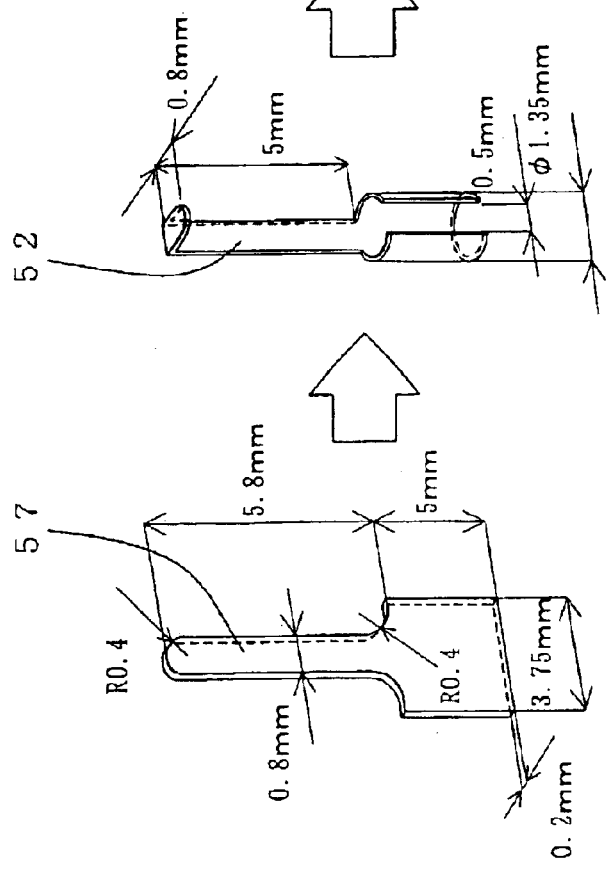

Then, the anchor member 52 and the flap ventlid 51 were bonded by percussion welding to form the flap ventlid installation assembly 60 shown in FIG. 23(d). The conditions of the welding were as follows: an electrode made of pure copper and having a welding electrode diameter of φ00.8 mm was used and the welding power was 15 W sec.

The thus formed flap ventlid installation assembly 60 was installed in the tire mold 53 (see FIG. 22) by press fitting the assembly into the venthole 54 (see FIG. 22) to form a tire mold of Example 1.

Good results were obtained after continuously molding 20000 tires using the tire mold a of Example 1, without "bear" defects or spew at the positions corresponding to the ventholes. Furthermore, no defects such as the flap ventlid installation assembly falling off of the tire mold occurred.

Example 2

Figures 24A, 24B, 24C, 24D:
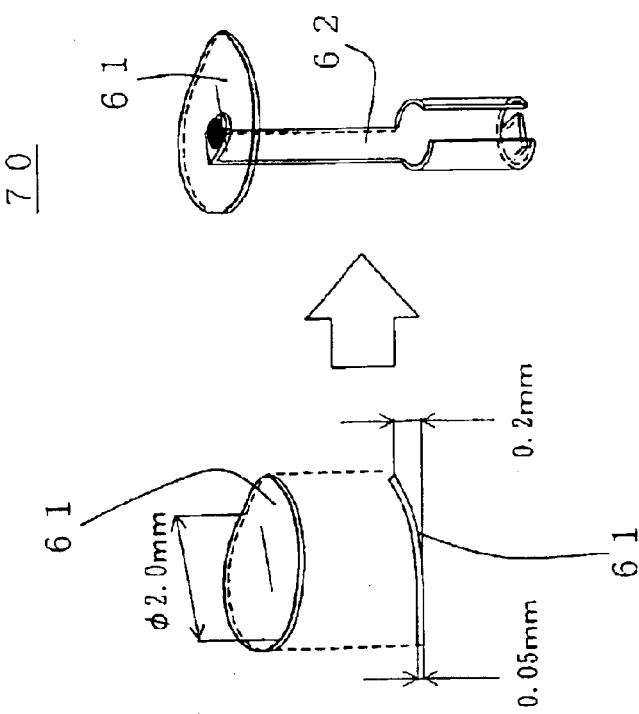
FIG. 24(a) to FIG. 24(d) are explanatory drawings which show the steps in sequence of forming the flap ventlid installation assembly used in Example 2.

In Example 2, an anchor material 67 as shown in FIG. 24(a) was formed, and an anchor member 62 having projections as shown in FIG. 24(b) was formed. Furthermore, as shown in FIG. 24(c), a flap ventlid 61 having an outer diameter of φ02.0 mm was welded as shown in FIG. 24(d) to form a flap ventlid installation assembly 70. The anchor member 62 and flap ventlid 61 were formed of the same material as in Example 1, and the same age-hardening heat treatment was performed. This flap ventlid installation assembly 70 was installed in the tire mold 53 (see FIG. 22) by press fitting the assembly into the venthole 54 (see FIG. 22) to form a tire mold of Example 2.

Clogging occurred in the ventholes 54 (see FIG. 22) in which the flap ventlid installation assemblies 70 were installed after continuously molding 3000 tires using the tire mold of Example 2. When the flap ventlid installation assemblies 70 were drawn out from the ventholes 54 (see FIG. 22), nearly all clogging materials could be removed in each of the flap ventlid installation assemblies 70.

Example 3

Figure 25A:
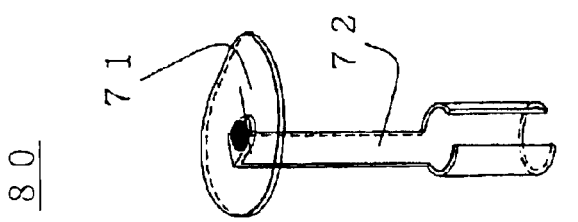
FIG. 25(a) to FIG. 25(d) are explanatory drawings which show the steps in sequence of forming the flap ventlid installation assembly used in Example 3.
Figure 25B:
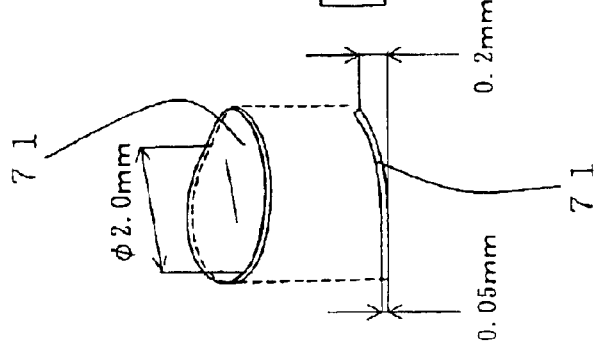

In Example 3, an anchor material 77 having the shape as shown in FIG. 25(a) was formed using a solution heat treated material (BeA25), and this was heated at 800° C. for 1 hour and then quenched. Next, the anchor material 77 was bent in such a shape as shown in FIG. 25(b) and then subjected to age-hardening heat treatment to form an anchor member 72. The age-hardening heat treatment was performed by heating at 320° C. for 2 hours and then subjecting to air cooling.

Figure 25C:
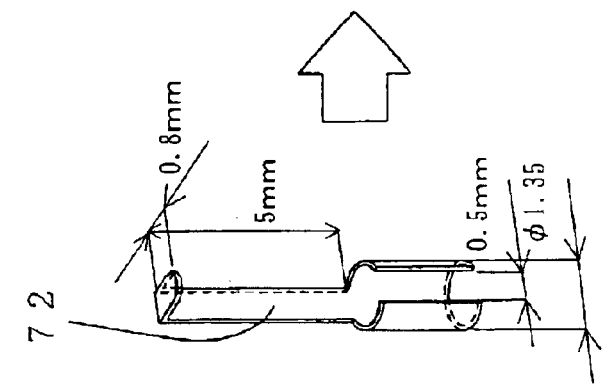

Then, a flap ventlid 71 having the shape as shown in FIG. 25(c) was formed. The flap ventlid 71 was formed using Inconel 718, and this was subjected to heat treatment at 955° C. for 1 hour, then air cooling, bending, heating at 720° C. for 8 hours, cooling in a furnace, further heating at 620° C. for 8 hours, and then air cooling.

Figure 25D:
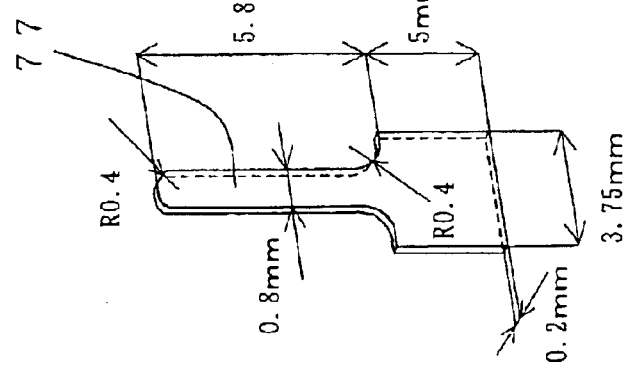

Then, the anchor member 72 and the flap ventlid 71 were bonded by percussion welding to form a flap ventlid installation assembly 80 as shown in FIG. 25(d). The conditions of the welding were as follows: An electrode made of pure copper and having a welding electrode diameter of φ0.8 mm was used and the welding power was 20 W sec.

The thus formed flap ventlid installation assembly 80 was installed in the tire mold 53 (see FIG. 22) by press fitting the assembly into the venthole 54 (see FIG. 22) to form a tire mold of this example.

Clogging occurred in the ventholes 54 (see FIG. 22) in which the flap ventlid installation assemblies 80 were installed after continuously molding 3000 tires using the tire mold of Example 3. When the flap ventlid installation assemblies 80 were drawn out from the ventholes 54 (see FIG. 22), nearly all of the clogging materials (foreign matter) could be removed in each of the flap ventlid installing assemblies 80.

Example 4

In Example 4, an anchor material 87 having the shape as shown in FIG. 26(a) was formed using a solution heat treated material (BeA25), heated at 800° C. for 1 hour and then quenched. Next, one end portion of the anchor material 87 was crushed in the form of a plane by pincers as shown in FIG. 26(b) and then subjected to age-hardening heat treatment (heating at 280° C. for 2 hours and then air cooling) as shown in FIG. 26(c).

Next, a flap ventlid 81 having the shape as shown in FIG. 25(d) was formed. The flap ventlid 81 was formed using Inconel 718, which was subjected to heating at 955° C. for 1 hour, then air cooling, bending, heating at 720° C. for 8 hours, cooling in a furnace, further heating at 620° C. for 8 hours, and then air cooling.

Then, the anchor member 82 and the flap ventlid 81 were bonded by percussion welding to form a flap ventlid installation assembly 90 as shown in FIG. 26(e). The conditions of the welding were as follows: An electrode made of pure copper and having a welding electrode diameter of φ0.8 mm was used and the welding power was 20 W sec.

When the thus formed flap ventlid installation assembly 90 was installed in a tire mold in which the ventholes were clogged, the top portion of the anchor member 82 pushed out the foreign matter which caused the clogging to solve the clogging of the ventholes. The end portion of the anchor member projecting from the opening of the venthole on the side opposing the design surface was bent at the opening to form the tire mold of Example 4.

Good results were obtained after continuously molding 20000 tires using the tire mold of Example 4, without causing bear defects or forming spew at the positions corresponding to the ventholes. Furthermore, no defects such as the flap ventlid installation assembly falling off of the tire mold occurred.

As explained above, according to the present invention, a flap ventlid is provided which can prevent occurrence of spew (whisker projections) and burred extensions on a tire surface during tire molding and can retain the desired initial performance or external appearance of the tire obtained in a satisfactory state and can be simply installed in a mold for molding a tire. Clogging caused by penetration of rubber burrs etc. into the air removing holes (ventholes) of the mold for molding tires can also be easily solved.

What is claimed is:

1. A flap ventlid installation assembly for installing a flap ventlid at an opening of an air removing hole that is formed on a design surface of a tire mold and extends in a longitudinal direction toward an opposed surface of the tire mold opposing the design surface said flap ventlid installation assembly comprising:

a flap ventlid which functions as an opening and closing lid that passes or interrupts air flow at the opening of the air removing hole; and an anchor member, having a top portion which is connected to said flap ventlid and a longer portion that extends from said top portion to an opposed second end in the longitudinal direction of the air removing hole, said longer portion of said anchor member having a first shape proximate said second end thereof that cannot be inserted as it is into the air removing hole through the opening on the design surface of the tire mold without applying an external force to said first shape to cause elastic deformation of said first shape to form a second shape that can be press-fit into the air removing hole through the opening on the design surface of the tire mold;

wherein said flap ventlid is adapted to be installed in said tire mold such that at least a part of said flap ventlid contacts the design surface of the tire mold when said anchor member is press-fit into the opening of the air removing hole on the design surface of the tire mold such that said second shape engages a portion of the air removing hole proximate the surface of the tire mold opposing the design surface.

2. A flap ventlid installation assembly for installing a flap ventlid at an opening of an air removing hole formed on a design surface of a tire mold and having a depth that extends in a longitudinal direction toward another opening formed on an opposed surface of the tire mold opposing the design surface, said flap ventlid installation assembly comprising:

a flap ventlid which functions as an opening and closing lid that passes or interrupts air flow at the opening of the air removing hole; and an anchor member having a top portion which is connected to said flap ventlid and a length dimension that extends from said top portion to an opposed second end portion in the longitudinal direction of the air removing hole which is longer than the depth of the air removing hole of the tire mold, said anchor member comprising or being coated with a copper or copper alloy material;

wherein said flap ventlid is adapted to be installed in the tire mold such that at least a part of said flap ventlid contacts the design surface of the tire mold when said anchor member is inserted into the air removing hole and when said second end portion of said anchor member that projects from the other opening of the air removing hole on the side of the tire mold opposing the design surface is bent proximate the other opening of the air removing hole on the side of the tire mold opposing the design surface.

3. A flap ventlid installation structure comprising the flap ventlid installation assembly of claim 1 installed in the air removal hole of the tire mold, wherein said anchor member is press-fit into the air removing hole on the design surface of the tire mold such that at least a part of said flap ventlid contacts the design surface of the tire mold press-fit.

4. A flap ventlid installation structure comprising the flap ventlid installation assembly of claim 2 installed in the air removal hole of the tire mold such that at least a part of said flap ventlid contacts the design surface of the tire mold when said anchor member is inserted into the air removing hole and said second end portion of said anchor member that projects from the other opening of the air removing hole on the side of the tire mold opposing the design surface is bent at the other opening of the air removing hole on the side of the tire mold opposing the design surface.

5. The flap ventlid installation structure according to claim 3, wherein said anchor member further comprises a projection member for raking out foreign matters present in the air removal hole when said flap ventlid installation assembly is removed from the air removing hole of the tire mold.

6. The flap ventlid installation structure according to claim 3, wherein said anchor member comprises a material to which tire molding debris present in the air removing hole readily adheres or said material is coated on a surface of said anchor member such that the tire molding debris present in the air removing hole is removed when said flap ventlid installation assembly is removed from the air removing hole of the tire mold.

7. The flap ventlid installation structure according to claim 6, wherein said material comprises copper or a copper alloy.

8. A tire mold provided with the flap ventlid installation structure according to claim 3.

* * * * *

UNITED STATES PATENT AND TRADEMARK OFFICE
CERTIFICATE OF CORRECTION

PATENT NO. : 6,805,540 B2
DATED : October 19, 2004
INVENTOR(S) : Yasuyuki Ishihara It is certified that error appears in the above-identified patent and that said Letters Patent is hereby corrected as shown below:

Title page,
Item [54], Title, replace with -- FLAP VENTLID INSTALLATION ASSEMBLY, FLAP VENTLID INSTALLATION STRUCTURE, OF INSTALLING FLAP VENTLID INSTALLATION ASSEMBLY AND TIRE MOLD INCLUDING SAME --.
Item [73], Assignee, change "Industries" to -- Insulators --.

Column 1,
Lines 6-10, delete the entire paragraph appearing after the title and before "BACKGROUND OF THE INVENTION".

Column 4,
Line 1, add -- a -- after "when".
Line 59, change "apart" to -- a part --.
Line 65, change "f lap" to -- flap --.

Column 10,
Line 18, change "May" to -- may --.

Column 13,
Line 36, change "apart" to -- a part --.

Column 22,
Line 27, change "matters" to -- matter --.

Signed and Sealed this

Fourteenth Day of March, 2006

JON W. DUDAS
*Director of the United States Patent and Trademark Office*